US012776812B2

(12) United States Patent
Frenne et al.

(10) Patent No.: US 12,776,812 B2
(45) Date of Patent: Oct. 27, 2026

(54) MEASUREMENT PROCEDURES FOR DRS WITH BEAMFORMING

(71) Applicant: Telefonaktiebolaget LM Ericsson (publ), Stockholm (SE)

(72) Inventors: Mattias Frenne, Uppsala (SE); Robert Mark Harrison, Grapevine, TX (US); Muhammad Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 126 days.

(21) Appl. No.: 18/095,396

(22) Filed: Jan. 10, 2023

(65) Prior Publication Data

US 2023/0216548 A1 Jul. 6, 2023

Related U.S. Application Data

(60) Continuation of application No. 17/171,883, filed on Feb. 9, 2021, now Pat. No. 11,552,679, which is a (Continued)

(51) Int. Cl.
*H04B 7/0408* (2017.01)
*H04B 7/06* (2006.01)
(Continued)

(52) U.S. Cl.
CPC ........... *H04B 7/0408* (2013.01); *H04L 5/005* (2013.01); *H04W 24/10* (2013.01); *H04B 7/0626* (2013.01); *H04W 84/042* (2013.01)

(58) Field of Classification Search
CPC ..... H04B 7/0408; H04B 7/0626; H04L 5/005; H04W 84/042
See application file for complete search history.

(56) References Cited

U.S. PATENT DOCUMENTS

2010/0323612 A1* 12/2010 Xu ........................ H04L 5/0051 455/7
2013/0115985 A1 5/2013 Davydov et al.
(Continued)

FOREIGN PATENT DOCUMENTS

CN 102461010 A 5/2012
CN 104485984 A 4/2015
(Continued)

OTHER PUBLICATIONS

3GPP, "3rd Generation Partnership Project; Technical Specification Group Radio Access Network; Evolved Universal Terrestrial Radio Access (E-UTRA); Physical Layer; Measurements (Release 12)", 3GPP TS 36.214, Version 12.2.0, Mar. 2015, 17 pages.
(Continued)

*Primary Examiner* — Jaison Joseph

(57) ABSTRACT

Systems and methods relating to transmission and use of Discovery Reference Signal (DRS) signals are disclosed herein. In some embodiments, a method of operation of a Transmission Point (TP) in a cellular communications network comprises transmitting, from the TP, a same one or more DRS signals using at least two different transmit beams in at least two different time resources. Each transmit beam is characterized by a direction in which it is transmitted. In this manner, the TP is enabled to reuse DRS resources, which in turn enables transmission of DRS signals on a larger number of transmit beams and, correspondingly, adaptation of measurement procedures at wireless devices to obtain measurements on those transmit beams.

20 Claims, 14 Drawing Sheets

Related U.S. Application Data continuation of application No. 16/586,362, filed on Sep. 27, 2019, now Pat. No. 10,917,142, which is a division of application No. 15/573,206, filed as application No. PCT/IB2016/052709 on May 11, 2016, now Pat. No. 10,469,138.

(60) Provisional application No. 62/161,788, filed on May 14, 2015.

(51) Int. Cl.

| | |
|---|---|
| ***H04L 5/00*** | (2006.01) |
| ***H04W 24/10*** | (2009.01) |
| ***H04W 84/04*** | (2009.01) |

(56) References Cited

U.S. PATENT DOCUMENTS

| | | | | |
|---|---|---|---|---|
| 2015/0189574 | A1* | 7/2015 | Ng | H04W 24/08 370/254 |
| 2015/0215856 | A1* | 7/2015 | Kim | H04W 24/08 370/252 |
| 2015/0312784 | A1* | 10/2015 | You | H04L 27/2613 370/252 |
| 2015/0327097 | A1* | 11/2015 | Chai | H04W 24/08 370/252 |
| 2015/0358827 | A1* | 12/2015 | Bendlin | H04W 72/541 455/454 |
| 2015/0382171 | A1* | 12/2015 | Roy | H04Q 3/08 370/329 |
| 2016/0135148 | A1* | 5/2016 | Novlan | H04L 5/0032 370/329 |
| 2016/0302230 | A1* | 10/2016 | Novlan | H04B 17/318 |
| 2016/0316374 | A1* | 10/2016 | Xu | H04W 16/14 |
| 2016/0345216 | A1* | 11/2016 | Kishiyama | H04W 48/12 |
| 2017/0048041 | A1* | 2/2017 | Yi | H04W 52/0206 |
| 2017/0048826 | A1* | 2/2017 | Kishiyama | H04W 72/04 |
| 2017/0195028 | A1* | 7/2017 | Shimezawa | H04B 7/0626 |
| 2017/0223686 | A1* | 8/2017 | You | H04L 5/005 |
| 2017/0257785 | A1* | 9/2017 | Henttonen | H04W 24/10 |
| 2017/0276761 | A1* | 9/2017 | Park | G01S 5/0242 |
| 2017/0289818 | A1* | 10/2017 | Ng | H04L 5/0053 |
| 2017/0366996 | A1* | 12/2017 | Park | H04W 24/10 |
| 2018/0020479 | A1* | 1/2018 | Harada | H04W 74/006 |

FOREIGN PATENT DOCUMENTS

| | | | |
|---|---|---|---|
| CN | 102916735 | B | 6/2016 |
| CN | 103780359 | B | 7/2017 |
| CN | 104335501 | B | 9/2018 |
| WO | 2014124237 | A1 | 8/2014 |
| WO | 2014178648 | A1 | 11/2014 |
| WO | 2015065110 | A1 | 5/2015 |

OTHER PUBLICATIONS

3GPP, "3rd Generation Partnership Project; Technical Specification Group Radio Access Network; Evolved Universal Terrestrial Radio Access (E-UTRA); Radio Resource Control(RRC); Protocol Specification (Release 12)", Technical Specification 36.331, Version 12.5.0, 3GPP Organizational Partners, Mar. 2015, 445 pages.

LG Electronics, "Discussion on Potential Enhancements for Indoor Positioning", 3GPP TSG RAN WG1 Meeting #80, R1-150229, Athens, Greece, Feb. 9-13, 2015, 4 pages.

LG Electronics, "Discussion on RRM Enhancements", 3GPP TSG RAN WG1 Meeting #80bis, R1-151537, Belgrade, Serbia, Apr. 20-24, 2015, 4 pages.

NVIDIA, "On the Need of RRM Enhancements for FD-MIMO", 3GPP TSG-RAN WG1 Meeting #80bis, R1-151754, Belgrade, Serbia, Apr. 20-24, 2015, 4 pages.

Ericsson et al., "Correction of antenna configuration and beamforming model for DRS", 3GPP TSG-RAN WG4 Meeting #55, R4-101905, Montreal, Canada, May 10-14, 2010.

* cited by examiner

MEASUREMENT PROCEDURES FOR DRS WITH BEAMFORMING

RELATED APPLICATIONS

This application is a continuation application of U.S. patent application Ser. No. 17/171,883, filed Feb. 9, 2021, granted as U.S. Pat. No. 11,552,679 on Jan. 10, 2023, which is a continuation application of U.S. patent application Ser. No. 16/586,362, filed Sep. 27, 2019, granted as U.S. Pat. No. 10,917,142 on Feb. 9, 2021, which is a divisional application from U.S. patent application Ser. No. 15/573,206, filed Nov. 10, 2017, granted as U.S. Pat. No. 10,469,138 on Nov. 5, 2019, which is a 35 U.S.C. § 371 national phase filing of International Application No. PCT/IB2016/052709, filed May 11, 2016, which claims the benefit of U.S. Provisional Patent Application No. 62/161,788, filed May 14, 2015, the disclosures of which are hereby incorporated herein by reference in their entireties.

TECHNICAL FIELD

This disclosure pertains to measurement procedures for discovery signals with beamforming.

BACKGROUND

Long Term Evolution (LTE) Frame Structure and Reference Signals

Third Generation Partnership Project (3GPP) LTE technology is a mobile broadband wireless communication technology in which transmissions from base stations (referred to as enhanced or evolved Node Bs (eNBs)) to wireless devices (e.g., mobile stations) (referred to as User Equipment devices (UEs)) are sent using Orthogonal Frequency Division Multiplexing (OFDM). OFDM splits the signal into multiple parallel sub-carriers in frequency. As illustrated in FIG. 1, the basic unit of transmission in LTE is a Resource Block (RB), which in its most common configuration consists of 12 subcarriers and 7 OFDM symbols (one slot). A unit of 1 subcarrier and 1 OFDM symbol is referred to as a Resource Element (RE). Thus, an RB consists of 84 REs. An LTE radio subframe is composed of two slots in time and multiple RBs in frequency with the number of RBs determining the bandwidth of the system. Furthermore, the two RBs in a subframe that are adjacent in time are denoted as an RB pair. FIG. 2 illustrates an RB pair in a downlink subframe. Currently, LTE supports standard bandwidth sizes of 6, 15, 25, 50, 75, and 100 RB pairs.

In the time domain, LTE downlink transmissions are organized into radio frames of 10 milliseconds (ms), each radio frame consisting of ten equally-sized subframes of length $T_{subframe}$=1 ms.

Discovery Signals for Small Cells

With the densification of small cells (cells with lower transmission power and thus smaller coverage) and potentially increased number of carriers in small cell scenarios, Discovery Reference Signal (DRS) features have been introduced in 3GPP LTE Release 12 (Rel-12). In Rel-12, a DRS occasion has been defined as a duration within which DRS signals are transmitted by a cell. The DRS signals included in the DRS occasion on a cell are shown in FIG. 3. In particular, FIG. 3 illustrates REs used by DRS signals in a Physical RB (PRB) pair for two different cells (e.g., transmitted by two different Transmission Points (TPs)). As shown, the DRS signals include a Primary Synchronization Signal (PSS), a Secondary Synchronization Signal (SSS), a Common Reference Signal (CRS), and, if configured, a Channel State Information Reference Signal (CSI-RS). With respect to CSI-RS, FIG. 3 illustrates both REs used for CSI-RS belonging to the DRS occasion as well as REs potentially used for CSI-RS belonging to a DRS occasion. While the DRS signals enable small cell on/off, they can also be utilized when small cell on/off is not being used in a cell and also in non-small cells (with arbitrary transmission power).

The DRS signals in a DRS occasion are comprised of the PSS, the SSS, the CRS, and, when configured, the CSI-RS. The PSS and the SSS are used for coarse synchronization, when needed, and for cell identification. The CRS is used for fine time and frequency estimation and tracking and may also be used for cell validation, i.e., to confirm the cell Identity (ID) detected from the PSS and the SSS. The CSI-RS is another signal that can be used in dense deployments for cell or TP identification. FIG. 3 shows the presence of these signals in a DRS occasion of length equal to two subframes and also shows the transmission of the signals over two different cells or TPs.

The DRS occasion corresponding to transmissions from a particular cell may range in duration from one to five subframes for Frequency Division Duplexing (FDD) and two to five subframes for Time Division Duplexing (TDD). The subframe in which the SSS occurs marks the starting subframe of the DRS occasion. This subframe is either subframe 0 or subframe 5 in both FDD and TDD. In TDD, the PSS appears in subframe 1 and subframe 6 while in FDD the PSS appears in the same subframe as the SSS. The CRSs are transmitted in all downlink subframes and Downlink Part of the Special Subframe (DwPTS) regions of special subframes.

The CSI-RS may be transmitted in any of the downlink subframes, but with any restrictions associated with each subframe. For the purposes of the DRS signal, only a single port (port 15) of CSI-RS is transmitted. There are up to twenty possible RE configurations within a subframe, although the number of configurations is restricted to 5 in subframe 0 (to account for transmission of the Physical Broadcast Channel (PBCH) which uses many of the same REs in the six PRBs centered around the carrier frequency) and to 16 in subframe 5. In a DRS occasion transmitted from a cell, a CSI-RS intended to represent a single measureable entity, loosely referred to as a TP, can occur in any RE configuration in any of the downlink subframes that are part of the DRS occasion. Thus, considering that the DRS occasion may be up to 5 subframes long in an FDD frame structure, the largest possible number of CSI-RS RE configurations is 96. This occurs when the DRS occasion starts with subframe 5 (a DRS occasion starting in subframe 0 would support fewer CSI-RS RE configurations) and consists of 16 configurations in subframe 5 and 20 in each of the four following subframes.

It is possible for a cell or TP to transmit CSI-RS in some CSI-RS RE configurations and transmit nothing in other CSI-RS RE configurations. The CSI-RE configurations where some signals are transmitted are then indicated to the UE as Non-Zero Power (NZP) CSI-RS RE configurations, while the CSI-RS configurations where nothing is transmitted are indicated as Zero Power (ZP) CSI-RS RE configurations. Using the NZP and ZP CSI-RS RE configurations, CSI-RS from two different cells or TPs can be effectively made orthogonal as shown in FIG. 3.

In each CSI-RS RE configuration, the symbols transmitted in the REs may be scrambled with a sequence dependent on a Virtual or Configurable Cell ID (VCID) which can take the same set of values as the Release 8 cell ID, i.e., up to 504 values. Although this creates the possibility of a very large number of CSI-RS possibilities, two CSI-RSs being transmitted with different scrambling codes over the same REs are not orthogonal. Hence, it is less robust to separate different CSI-RS transmissions using only scrambling codes as compared to using different RE configurations.

Radio Resource Management (RRM) Measurements with DRS

A description of how RRM measurements are performed with DRS signals is now provided. The DRS signals should be useable by the UE for performing cell identification, Reference Signal Received Power (RSRP), and Reference Signal Received Quality (RSRQ) measurements. The RSRP measurement definition based on DRS signals is the same as in prior releases of LTE. The Received Signal Strength Indication (RSSI) measurement is defined as an average over all OFDM symbols in the downlink parts of the measured subframes within a DRS occasion. The RSRQ is then defined as $$DRSRQ = N \times DRSRP/DRSSI,$$

where N is the number of PRBs used in performing the measurement, DRSRP is the RSRP measurement based on the DRS signals, and DRSSI is the RSSI measured over the DRS occasion.

In Rel-12, RSRP measurements based on the CRS and CSI-RS in the DRS occasions and RSRQ measurements based on the CRS in the DRS occasions have been defined. As stated earlier, DRS signals can be used in a small cell deployment where the cells are being turned off and on or in a general deployment where the on/off feature is not being used. For instance, DRS signals could be used to make RSRP measurements on different CSI-RS configurations in the DRS occasion being used within a cell, which enables the detection of different TPs in a shared cell.

When measurements are made on the CSI-RS in a DRS occasion, the UE restricts its measurements to a list of candidates sent to the UE by the network via Radio Resource Control (RRC) signaling. Each candidate in this list contains a Physical Cell ID (PCI), a VCID, and a subframe offset indicating the duration (in number of subframes) between the subframe where the UE receives the CSI-RS and the subframe carrying the SSS. This information allows the UE to limit its search. The UE correlates to the received signal candidates indicated by the RRC signal and reports back any CSI-RS RSRP values that have been found to meet some reporting criterion, e.g., exceeding a threshold value.

When a UE is being served on multiple carrier frequencies via a Primary Cell (PCell) and one or more Secondary Cells (SCells), the UE needs to perform RRM measurements on other cells on the currently used carrier frequencies (intra-frequency measurements) as well as on cells on other carrier frequencies (inter-frequency measurements). Since the discovery signals are not transmitted continuously, the UE needs to be informed about the timing of the discovery signals so as to manage its search complexity. Furthermore, when a UE is being served on as many carrier frequencies as it is capable of supporting and inter-frequency RRM measurements need to be performed on a different carrier frequency that is not currently being used, the UE is assigned a measurement gap pattern. This gap pattern on a serving frequency allows the UE to retune its receiver from that serving frequency to the other frequency on which measurements are being performed. During the duration of the measurement gap, the UE cannot be scheduled by the eNB on the current serving frequency. Knowledge of the timing of the discovery signals is especially important when the use of such measurement gaps is needed. Beyond mitigating UE complexity, this also ensures that the UE is not unavailable for scheduling for prolonged periods of time on the current serving frequencies (PCell or SCell).

The provision of such timing information is done via a Discovery Measurement Timing Configuration (DMTC) that is signaled to the UE. The DMTC provides a window with a duration of 6 ms occurring with a certain periodicity and timing within which the UE may expect to receive DRS signals. The duration of 6 ms is the same as the measurement gap duration as defined currently in LTE and allows the measurement procedures at the UE for DRS signals to be harmonized regardless of the need for measurement gaps. Only one DMTC is provided per carrier frequency including the current serving frequencies. The UE can expect that the network will transmit DRS signals so that all cells that are intended to be discoverable on a carrier frequency transmit DRS signals within the time window configured by the DMTCs. Furthermore, when measurement gaps are needed, it is expected that the network will ensure sufficient overlap between the configured DMTCs and measurement gaps.

In order to ensure the operating efficiency of the network, it is important that the different sets of UEs being served by an eNB do not have the same measurement gap pattern defined for inter-frequency measurements so that all UEs are not unavailable for scheduling simultaneously on the serving carrier frequency. FIG. 4 and FIG. 5 show some possible configurations of DMTC time windows or measurement gaps for UEs that satisfy the above constraints. In FIG. 4, the measurement gap or DMTC periodicity is set to be a multiple of the DRS occasion periodicity. The UEs being served by the eNB on a serving frequency are then partitioned into multiple non-overlapping groups. In FIG. 4, the DRS occasion periodicity is 40 ms while the measurement gap and the DMTC is configured to occur every 80 ms. The UEs are partitioned into two groups so that when one group of UEs is performing inter-frequency measurements, the other group of UEs is available for scheduling. FIG. 5 shows an alternate configuration where the DMTC time window and the DRS occasions have the same periodicity. However, each cell transmits DRSs in multiple instances of the DRS occasion and different groups of UEs are assigned different measurement gaps or DMTCs that align with one of the instances of the DRS occasion.

Beamforming

In order to enhance system capacity and to reduce interference, the network node (e.g., base station or eNB) may use beamforming (i.e., UEs are served with transmit beams pointing in their direction). The beamforming is realized by virtue of a Multiple Input Multiple Output (MIMO) technique where a signal is transmitted in a beam by applying the same signal to multiple co-located transmit antennas and applying a phase shift per transmit antenna. The phase shift determines the pointing direction of the transmit beam. MIMO implies that both the network node and the UE employ multiple antennas, but it should be noted that transmit beamforming from the network node can be used in case the UE has a single antenna as well.

The MIMO configuration is generally represented by a notation (M×N) in terms number of transmit (M) and receive antennas (N). Common MIMO configurations used are: (2×1), (1×2), (2×2), (4×2), (8×2), and (8×4). The MIMO configurations represented by (2×1) and (1×2) are special cases of MIMO, and they correspond to transmit diversity and receiver diversity respectively. In LTE Release 12 and Release 13, up to M=16 and 32 is specified.

In order to create large number of sharp beams in vertical and azimuth directions (aka three dimensional beams), the network node may employ active antennas (aka Active Antenna System (AAS)). The AAS system comprises an array of a large number of antenna elements with a particular arrangement. For example, they can be arranged in the form of uniform linear array, 2-dimensional matrix (columns and rows), circular, etc. The antenna elements are electronically controlled to enable electronic amplification and/or other Radio Frequency (RF) processing. The electronic circuitry in a network node capable of the AAS system allows substantial flexibility to dynamically control the beam characteristics such as direction, shape, and strength of the beams. For example, the beam's elevation and azimuth angles, beamwidth of the radiation pattern, etc. can be electronically controlled depending on, for example, the UE location.

SUMMARY

Systems and methods relating to transmission and use of Discovery Reference Signal (DRS) signals are disclosed herein. In some embodiments, a method of operation of a Transmission Point (TP) in a cellular communications network comprises transmitting, from the TP, a same one or more DRS signals using at least two different transmit beams in at least two different time resources. Each transmit beam is characterized by a direction in which it is transmitted. In this manner, the TP is enabled to reuse DRS resources, which in turn enables transmission of DRS signals on a larger number of transmit beams and, correspondingly, adaptation of measurement procedures at wireless devices to obtain measurements on those transmit beams.

In some embodiments, transmitting the same one or more DRS signals using the at least two different transmit beams in the at least two different time resources comprises transmitting the one or more DRS signals using a first transmit beam, but not a second transmit beam, in a first time resource, and transmitting the one or more DRS signals using the second transmit beam, but not the first transmit beam, in a second time resource. The second transmit beam is different than the first transmit beam, and the second time resource is different than the first time resource.

In some embodiments, the one or more DRS signals comprise a Channel State Information Reference Signal (CSI-RS). In some embodiments, the one or more DRS signals comprise a Primary Synchronization Signal (PSS) for a Physical Cell Identity (PCI), a Secondary Synchronization Signal (SSS) for the same PCI, and a Common Reference Signal (CRS) for the same PCI. In some embodiments all DRS signals are beamformed. However in some embodiments only a subset of DRS signals are beamformed.

In some embodiments, each time resource of the at least two different time resources a time slot, a subframe, a symbol time, a frame, a Transmit Time Interval (TTI), or an interleaving time.

In some embodiments, the at least two different time resources are at least two different DRS occasions, and transmitting the same one or more DRS signals using the at least two different transmit beams in the at least two different time resources comprises transmitting the same one or more DRS signals using the at least two different transmit beams in the at least two different DRS occasions.

In some embodiments, the at least two different time resources are at least two time resources within a same DRS occasion, and transmitting the same one or more DRS signals using the at least two different transmit beams in the at least two different time resources comprises transmitting the same one or more DRS signals using the at least two different transmit beams in the at least two different time resources within the same DRS occasion.

In some embodiments, transmitting the same one or more DRS signals using the at least two different transmit beams in the at least two different time resources comprises transmitting the same one or more DRS signals according to a DRS transmit beam pattern that defines the at least two different transmit beams in the at least two different time resources in which the one or more DRS signals are to be transmitted. Further, in some embodiments, the DRS transmit beam pattern is a symmetric DRS transmit beam pattern. In other embodiments, the DRS transmit beam pattern is an asymmetric DRS transmit beam pattern. In other embodiments, the DRS transmit beam pattern is an aperiodic DRS transmit beam pattern.

In some embodiments, transmitting the same one or more DRS signals using the at least two different transmit beams in the at least two different time resources comprises deciding that the one or more DRS signals are to be transmitted using a DRS transmit beam pattern, deciding which DRS transmit beam pattern is to be used for transmission of the one or more DRS signals, and transmitting the same one or more DRS signals using the at least two different transmit beams in the at least two different time resources in accordance with the DRS transmit beam pattern. Further, in some embodiments, deciding that the one or more DRS signals are to be transmitted using a DRS transmit beam pattern comprises deciding that the one or more DRS signals are to be transmitted using a DRS transmit beam pattern based on one or more criteria selected from a group consisting of: a criterion that a request to use a DRS transmit beam pattern is received from another network node; a criterion that a DRS transmit beam pattern is to be used when beamforming is used or is expected to be used by the TP; a criterion that a DRS transmit beam pattern is to be used when a number of transmit beams being used or expected to be used by the TP is greater than a predefined threshold; a criterion that a DRS transmit beam pattern is to be used when there is a large number of radio nodes in a coverage area of the TP; a criterion that a DRS transmit beam pattern is to be used when there is a limited number of different DRS resources available; a criterion that a DRS transmit beam pattern is to be used for a particular deployment scenario; a criterion that a DRS transmit beam pattern is to be used when system load is greater than a predefined threshold; a criterion based on measurement performance; and a criterion based on one or more DRS transmission parameters.

In some embodiments, transmitting the same one or more DRS signals using the at least two different transmit beams in the at least two different time resources comprises transmitting the same one or more DRS signals according to a DRS transmit beam pattern that defines the at least two different transmit beams in the at least two different time resources in which the one or more DRS signals are to be transmitted. The method further comprises providing information to a wireless device related to transmission of the one or more DRS signals in accordance with the DRS transmit beam pattern. In some embodiments, the information comprises an indication that the TP is or is expected to transmit DRS signals according to a DRS transmit beam pattern. In some embodiments, the information comprises an indication that the TP is or is expected to transmit the one or more DRS signals according to the DRS transmit beam pattern. In some embodiments, the information comprises information related to transmission of DRS signals in accordance with DRS transmit beam patterns in multiple cells.

In some embodiments, transmitting the same one or more DRS signals using the at least two different transmit beams in the at least two different time resources comprises transmitting the same one or more DRS signals according to a DRS transmit beam pattern that defines the at least two different transmit beams in the at least two different time resources in which the one or more DRS signals are to be transmitted. The method further comprises providing information to another network node related to transmission of the one or more DRS signals, by the TP, in accordance with the DRS transmit beam pattern.

In some embodiments, the method further comprises receiving one or more measurements from a wireless device based on the one or more DRS signals transmitted using the at least two different transmit beams in the at least two different time resources, and correlating each measurement of the one or more measurements to a respective one of the at least two different transmit beams. Further, in some embodiments, transmitting the same one or more DRS signals using the at least two different transmit beams in the at least two different time resources comprises transmitting the same one or more DRS signals according to a DRS transmit beam pattern that defines the at least two different transmit beams in the at least two different time resources in which the one or more DRS signals are to be transmitted. Correlating each measurement of the one or more measurements to the respective one of the at least two different transmit beams comprises correlating each measurement of the one or more measurements to the respective one of the at least two different transmit beams based on a known time resource in which the measurement was obtained and the DRS transmit beam pattern.

Embodiments of a TP for a cellular communications network are also disclosed. In some embodiments, a TP includes a transceiver, a processor, and memory storing instructions executable by the processor whereby the TP is operable to transmit, via the transceiver, a same one or more DRS signals using at least two different transmit beams in at least two different time resources. Each transmit beam is characterized by a direction in which it is transmitted.

In some embodiments, a TP for a cellular communications network is adapted to transmit a same one or more DRS signals using at least two different transmit beams in at least two different time resources. Each transmit beam is characterized by a direction in which it is transmitted. Further, in some embodiments, the TP is further adapted to perform the method of operation of a TP according to any of the embodiments described herein.

In some embodiments, a TP for a cellular communications network comprises a DRS transmission module operable to transmit a same one or more DRS signals using at least two different transmit beams in at least two different time resources. Each transmit beam being characterized by a direction in which it is transmitted.

Embodiments of a computer program are also disclosed. In some embodiments, a computer program comprises instructions which, when executed on at least one processor, cause the at least one processor to carry out the method of operation of a TP according to any of the embodiments described herein. Further, in some embodiments, a carrier containing the aforementioned computer program is disclosed, wherein the carrier is one of an electronic signal, an optical signal, a radio signal, or a computer readable storage medium.

Embodiments of a non-transitory computer readable medium are also disclosed. In some embodiments, a non-transitory computer readable medium stores software instructions that when executed by a processor of a TP for a cellular communications network cause the TP to transmit a same one or more DRS signals using at least two different transmit beams in at least two different time resources. Each transmit beam is characterized by a direction in which it is transmitted.

Embodiments of a method of operation of a wireless device in a cellular communications network are also disclosed. In some embodiments, a method of operation of a wireless device comprises obtaining information related to DRS transmission configuration. The information related to DRS transmission configuration comprising at least one of a group consisting of: DRS transmit beam pattern information that is related to a DRS transmit beam pattern used for one or more cells and measurement adaptation information used to adapt one or more measurement procedures. The method further comprises performing one or more measurements on one or more DRS signals in accordance with the information related to DRS transmission configuration and using at least one of the one or more measurements for one or more radio operation tasks.

In some embodiments, the information related to DRS transmission configuration comprises the DRS transmit beam pattern information, and the DRS transmit beam pattern information comprises an indication of whether at least one TP for the one or more cells is or is expected to transmit DRS signals according to a DRS transmit beam pattern.

In some embodiments, the information related to DRS transmission configuration comprises the DRS transmit beam pattern information, and the DRS transmit beam pattern information comprises an indication of a DRS transmit beam pattern that is or is expected to be used for transmission of a DRS resource for at least one of the one or more cells.

In some embodiments, the information related to DRS transmission configuration further comprises at least one of a group consisting of: information related to physical resources in which a DRS signal is transmitted, a bandwidth of the DRS signal, a measurement bandwidth for the DRS signal, and a periodicity of DRS occasions.

In some embodiments, obtaining the information related to DRS transmission configuration comprises obtaining the information related to DRS transmission configuration from a network node.

In some embodiments, obtaining the information related to DRS transmission configuration comprises obtaining the information related to DRS transmission configuration based on one or more predefined rules.

In some embodiments, obtaining the information related to DRS transmission configuration comprises obtaining the information related to DRS transmission configuration autonomously. In some embodiments, obtaining the information related to DRS transmission configuration autonomously comprises autonomously detecting whether different beams are used for transmission in at least one of a group consisting of: different DRS occasions and different time resources within a DRS occasion. In some embodiments, the method further comprises transmitting the information related to DRS transmission configuration to at least one of a group consisting of: a network node and another wireless device.

In some embodiments, performing the one or more measurements comprises adapting one or more measurement procedures based on the information related to DRS transmission configuration in order to perform the one or more measurements on the one or more DRS resources in accordance with the DRS transmission configuration information. Further, in some embodiments, performing the one or more measurements comprises adapting one or more measurement procedures based on the measurement adaptation information, and the measurement adaptation information comprises at least one of a group consisting of: a layer 3 filtering coefficient whose value is set such that DRS measurements made by the wireless device are not averaged, and a time to trigger parameter whose value is set such that the time to trigger a DRS reporting event in the wireless device is zero.

In some embodiments, adapting the one or more measurement procedures comprises at least one of a group consisting of switching between a first measurement mode for use when a DRS transmit beam pattern is not used for DRS transmission and a second measurement mode for use when a DRS transmit beam pattern is used for DRS transmission, reporting up to M measurements of different DRS resources but only M'<M measurements obtained for a same time resource, and adapting at least one measurement procedure to detect and differentiate between different beams that use a same DRS resource in different time resources.

In some embodiments, the one or more radio operation tasks comprise at least one of a group consisting of: performing a cell change, reporting at least one of the one or more measurements to a network node, reporting at least one of the one or more measurements to another wireless device, and determining a position of the wireless device.

In some embodiments, the one or more radio operation tasks comprise reporting at least one of the one or more measurements to a network node in association with an indication of a timing resource during which the at least one of the one or more measurements was obtained.

In some embodiments, the method further comprises signaling, to a network node, an indication of a capability of the wireless device to support transmission of DRS resources in accordance with a DRS transmit beam pattern.

Embodiments of a wireless device for a cellular communications network are also disclosed. In some embodiments, a wireless device comprises a transceiver, a processor, and memory storing instructions executable by the processor whereby the wireless device is operable to obtain information related to DRS transmission configuration, the information related to DRS transmission configuration comprising at least one of a group consisting of: DRS transmit beam pattern information that is related to a DRS transmit beam pattern used for one or more cells, and measurement adaptation information used to adapt one or more measurement procedures. The wireless device is further operable to perform one or more measurements on one or more DRS signals in accordance with the information related to DRS transmission configuration, and use at least one of the one or more measurements for one or more radio operation tasks.

In some embodiments, a wireless device for a cellular communications network is adapted to obtain information related to DRS transmission configuration, the information related to DRS transmission configuration comprising at least one of a group consisting of: DRS transmit beam pattern information that is related to a DRS transmit beam pattern used for one or more cells, and measurement adaptation information used to adapt one or more measurement procedures. The wireless device is further adapted to perform one or more measurements on one or more DRS signals in accordance with the information related to DRS transmission configuration, and use at least one of the one or more measurements for one or more radio operation tasks. In some embodiments, the wireless device is further adapted to operate according to any of the embodiments of the method of operation of a wireless device described herein.

In some embodiments, a wireless device for a cellular communications network comprises an information obtaining module operable to obtain information related to DRS transmission configuration, the information related to DRS transmission configuration comprising at least one of a group consisting of: DRS transmit beam pattern information that is related to a DRS transmit beam pattern used for one or more cells, and measurement adaptation information used to adapt one or more measurement procedures. The wireless device further comprises a measurement module operable to perform one or more measurements on one or more DRS resources in accordance with the information related to DRS transmission configuration, and a use module operable to use at least one of the one or more measurements for one or more radio operation tasks.

Embodiments of a computer program are also disclosed. In some embodiments, a computer program comprises instructions which, when executed on at least one processor, cause the at least one processor to carry out the method of operation of a wireless device according to any of the embodiments described herein. Further, in some embodiments, a carrier containing the aforementioned computer program is disclosed, wherein the carrier is one of an electronic signal, an optical signal, a radio signal, or a computer readable storage medium.

Embodiments of a non-transitory computer readable medium are also disclosed. In some embodiments, the non-transitory computer readable medium stores software instructions that when executed by a processor of a wireless device for a cellular communications network cause the wireless device to obtain information related to DRS transmission configuration, perform one or more measurements on one or more DRS resources in accordance with the information related to DRS transmission configuration, and use at least one of the one or more measurements for one or more radio operation tasks. The information related to DRS transmission configuration comprises at least one of a group consisting of: DRS transmit beam pattern information that is related to a DRS transmit beam pattern used for one or more cells, and measurement adaptation information used to adapt one or more measurement procedures.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
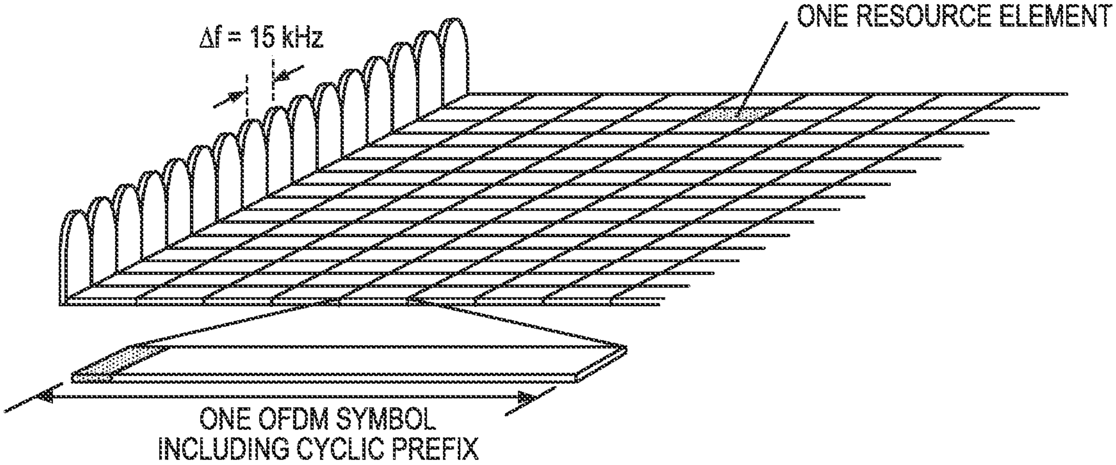
FIG. 1 (PRIOR ART)
FIG. 1 illustrates a downlink physical resource in Third Generation Partnership Project (3GPP) Long Term Evolution (LTE)
Figure 2:
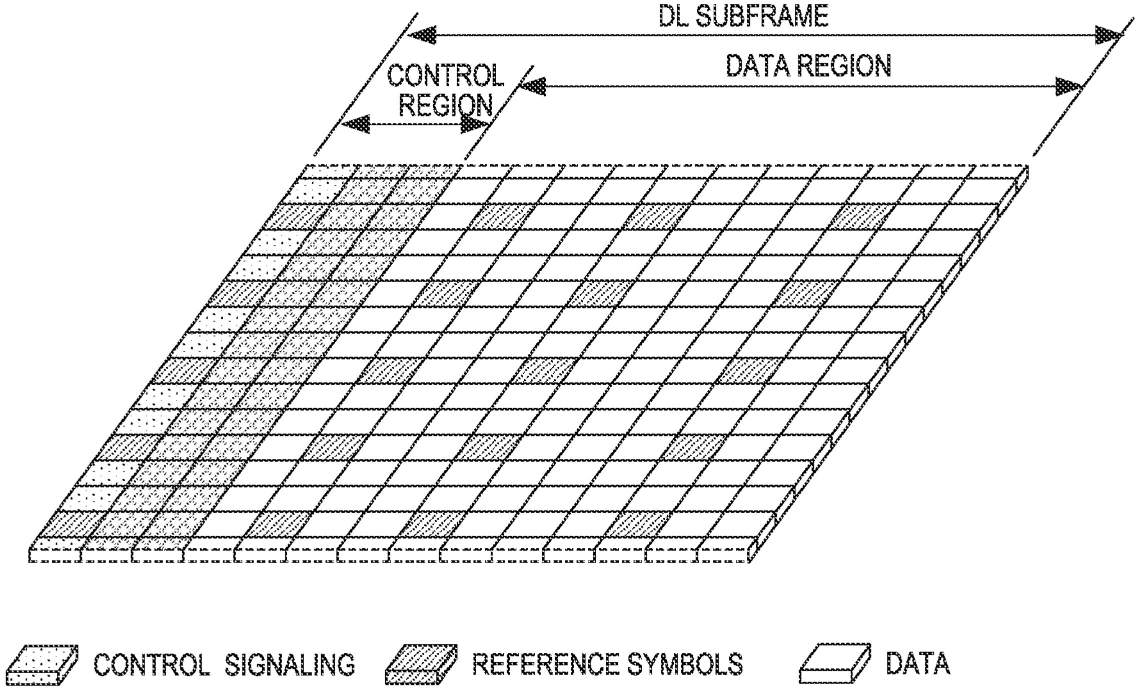
FIG. 2 (PRIOR ART)
FIG. 2 illustrates a downlink subframe in 3GPP LTE.
Figure 3:
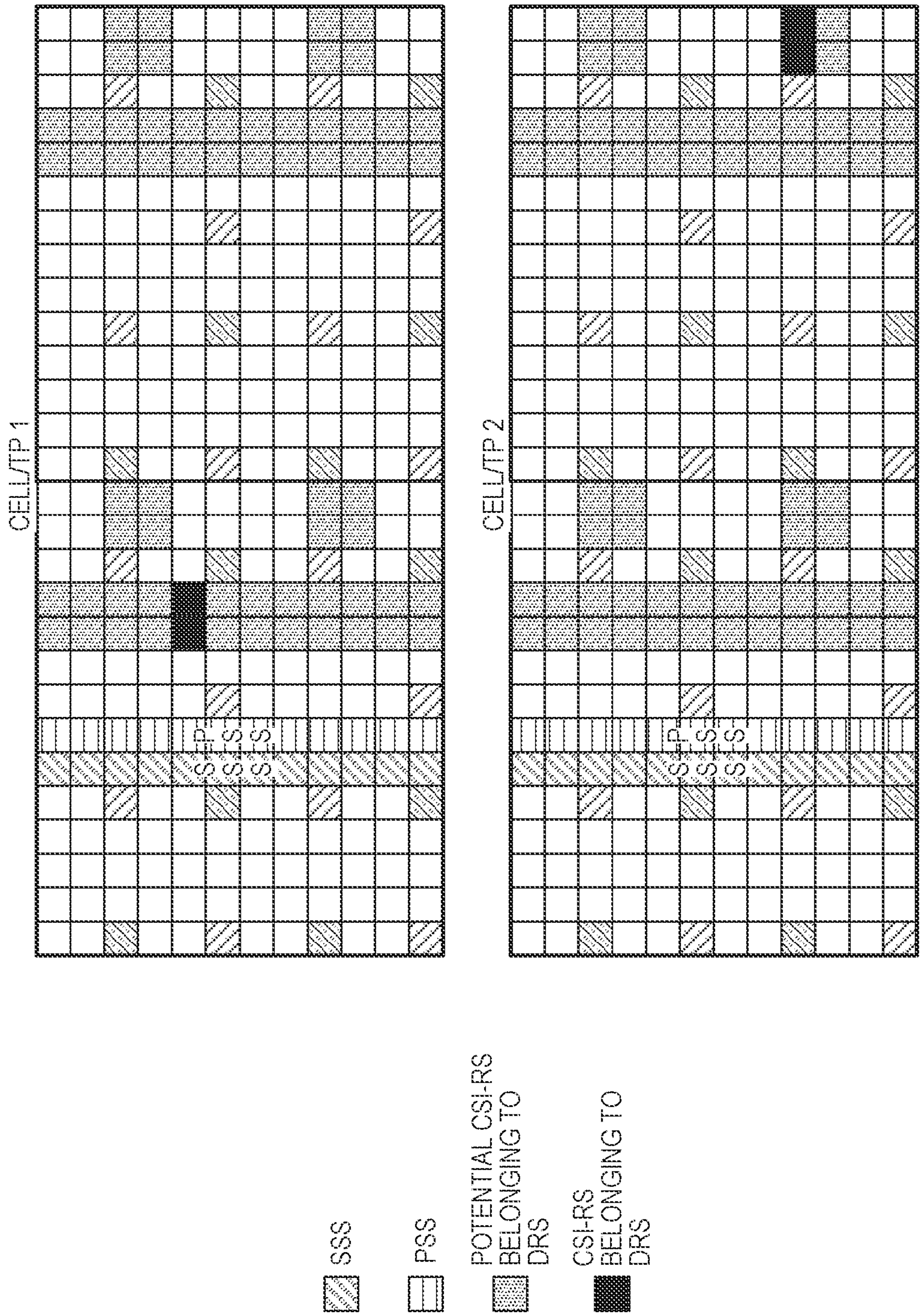
FIG. 3 illustrates Resource Elements (REs) used by Discovery Reference Signal (DRS) signals in a Physical Resource Block (PRB) pair.
Figure 4:
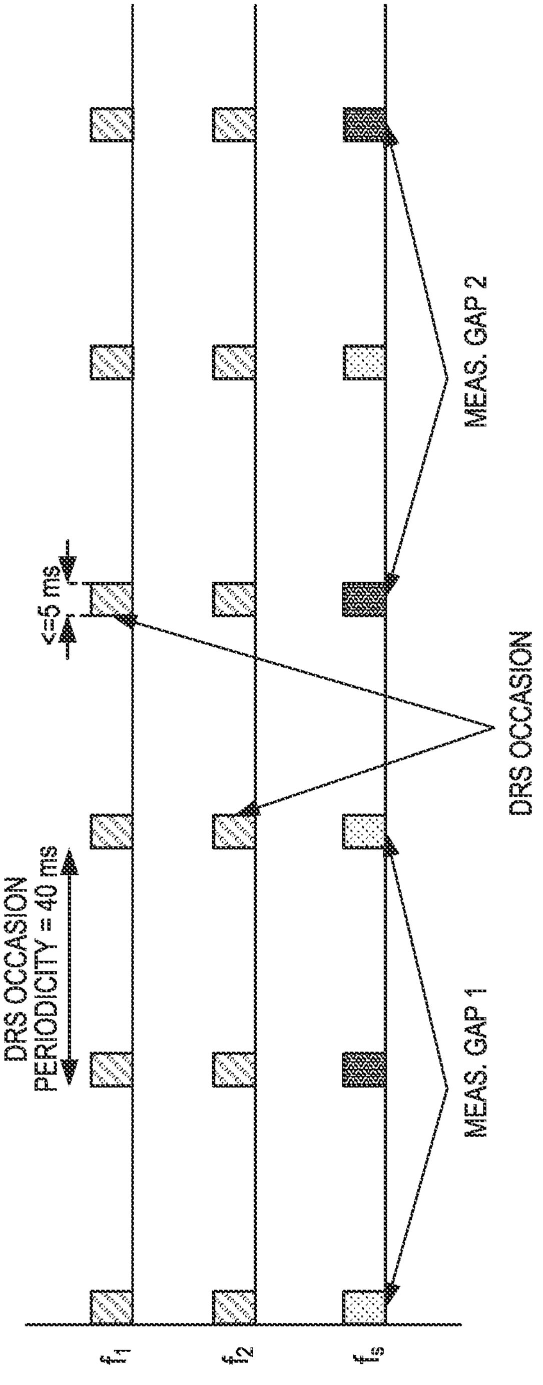
FIGS. 4 and 5 illustrate some possible configurations of Discovery Measurement Timing Configurations (DMTCs) or measurement gaps that satisfy constraints related to DRS signals and DRS occasions.
Figure 5:
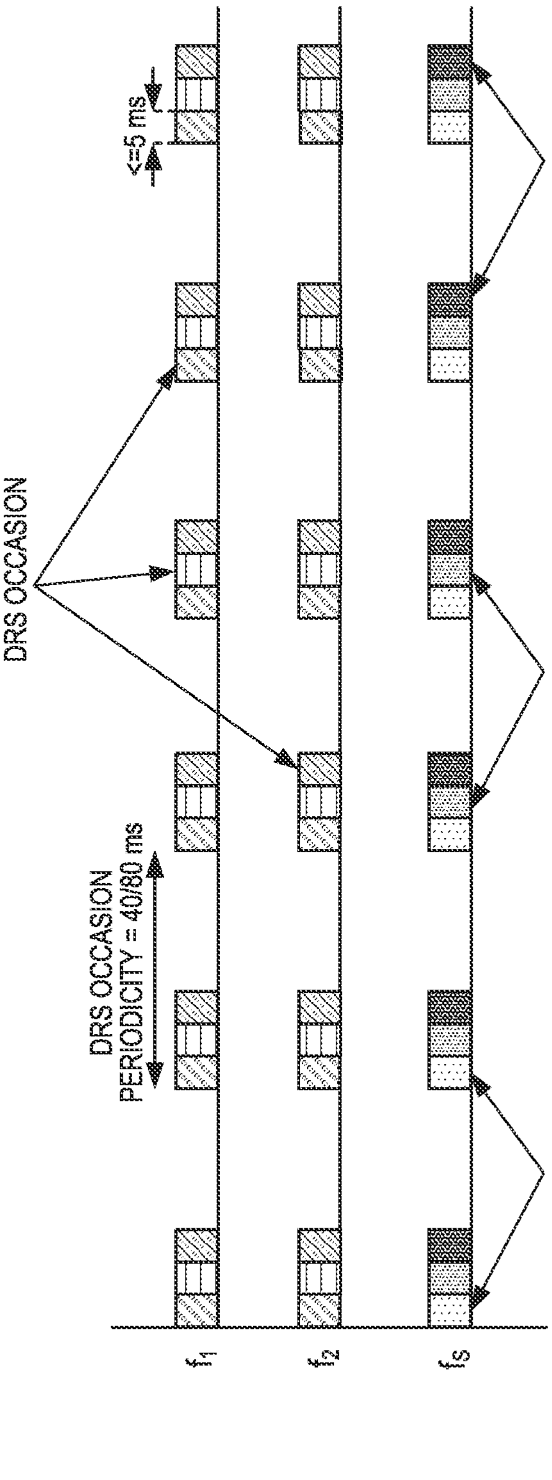

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Network Node: In some embodiments, the non-limiting term "network node" (also interchangeably referred to as node) is commonly used and refers to any type of network node which directly or indirectly communicates with a wireless device (e.g., a User Equipment (UE)) in a wireless communication network (e.g., a cellular communications network such as, e.g., a Third Generation Partnership Project (3GPP) Long Term Evolution (LTE) network). A network node can be a radio network node (also referred to as a radio access node) in a radio access network, a core network node in a core network, or a node in a fixed part of the network. For example, a network node can be a network node serving a wireless device (e.g., UE), a network node neighboring a serving network node of a wireless device, or any network node in the radio access network or in the core network in a wireless communication system in which the wireless device operates. Examples of a network node are a base station, a Multi-Standard Radio (MSR) radio node such as a MSR base station, an enhanced or evolved Node B (eNB), a network controller, a radio network controller, a base station controller, a relay, a donor node controlling relay, a Base Transceiver Station (BTS), an Access Point (AP), a core network node (e.g., a Mobile Switching Center (MSC), a Mobility Management Entity (MME), etc.), an Operations and Management (O&M) node, an Operations Support System (OSS) node, a Self-Organizing Network (SON) node, a positioning node (e.g., an Evolved Serving Mobile Location Center (E-SMLC)), a Minimization of Drive Test (MDT) node, etc.

Wireless Device: In some embodiments, the non-limiting term "wireless device" is used to refer to any type of wireless device communicating with a wireless communication system. One example of a wireless device is a UE. The term "UE" is a non-limiting term used herein to refer to any type of wireless device communicating with a network node in a cellular or mobile communication system over radio interface. Examples of UEs include a UE in a 3GPP LTE network, a target device, a Device-to-Device (D2D) UE, a Machine Type Communication (MTC) UE, a UE capable of Machine-to-Machine (M2M) communication, a Personal Digital Assistant (PDA), an iPAD, a tablet, a mobile terminal, a smart phone, Laptop Embedded Equipment (LEE), Laptop Mounted Equipment (LME), a Universal Serial Bus (USB) dongle, etc.

Discovery Reference Signal (DRS) or DRS Signal: As used herein, the non-limiting term "DRS signal" is used interchangeably with the terms "DRS" and "discovery signal." As used herein, the non-limiting term "DRS signal" is any type of discovery signal transmitted in a wireless communication network such as a cellular communications network. As an example, in a 3GPP LTE network, a DRS signal is a DRS signal transmitted by a Transmission Point (TP) during a DRS occasion, and the DRS signal is a Primary Synchronization Signal (PSS), a Secondary Synchronization Signal (SSS), a Common Reference Signal (CRS), a Channel State Information Reference Signal (CSI-RS), a Positioning Reference Signal (PRS), etc. transmitted by a TP in a DRS occasion. DRS signals can be transmitted in a cell in a DRS occasion (also referred to herein as a "discovery occasion") with some periodicity (aka DRS occasion periodicity or discovery occasion periodicity). A DRS occasion may contain a certain number of time resources (e.g., subframes) with DRS signals (e.g. between 1-6 subframes). Examples of a DRS occasion periodicity include 40 milliseconds (ms), 80 ms, and 160 ms. A DRS may be identified by a DRS index. A DRS index may be associated with a configuration of a DRS, such as one or more of its physical cell ID, scrambling identity, resource configuration (which OFDM symbols and subcarriers in a subframe carry the DRS), and its subframe offset (which subframe of the subframes in a DRS occasion carry the DRS).

DRS Resource: As used herein, the term "DRS resource" (also referred to as a "discovery resource") is a unique combination of DRS signal(s) (e.g., a unique combination of PSS, SSS, CRS, and CSI-RS). In other words, a DRS resource corresponds to one DRS configuration. Each DRS configuration configures one DRS resource including, for example, PSS, SSS, and potentially one CSI-RS.

DRS Occasion: As used herein, the term "DRS occasion" comprises one or more time resources (e.g., subframes) during which a DRS signal(s) is transmitted. A DRS occasion is also referred to as a "discovery occasion," "discovery signal occasion," "discovery signal transmission occasion," "discovery occasion reference signal occasion," "positioning occasion," "PRS occasion," etc.

Time Resource: In some embodiments, a non-limiting term "time resource" is used. As used herein, a "time resource" is any unit of time in a wireless communication system (e.g., a cellular communications network). For example, a time resource can be a time slot, a subframe, a symbol, a frame, a Transmit Time Interval (TTI), an interleaving time, etc.

Measurement: In some embodiments, a non-limiting term "measurement" is used. The embodiments are applicable for any type of measurement performed by a wireless device on any DRS signal. Examples of measurements which can be performed by the wireless device on a DRS signal(s) are cell search aka cell identification, Reference Signal Received Power (RSRP), Reference Signal Received Quality (RSRQ), Channel State Information RSRP (CSI-RSRP) (as defined in, e.g., 3GPP TS 36.214 V12.2.0, Section 5.1.20), CSI-RSRQ, Channel Quality Indication (CQI), CSI, UE reception-transmission (Rx-Tx) time difference, Signal to Interference plus Noise Ratio (SINR), DRS-SINR, etc. CSI-RSRQ on linear scale is a ratio of CSI-RSRP to RSSI, where RSSI is the total received power at the UE including all types of interference and noise. A measurement can be performed by the wireless device on one or more serving cells and/or on one or more neighbor cells. A measurement can also be performed on DRS signals transmitted by one or more TPs within the same cell, which can be a serving or neighbor cell. Therefore, one or more measurements done on a cell or a network node may also be interchangeably referred to as measurements done on the TP or signals of the TP.

Transmission or Transmit Point (TP): As used herein, the non-limiting term "TP" refers to a network node with one or multiple co-located antennas associated with a cell identity (PCI). A network node (for example an eNB or base station) may have a single TP or multiple, distributed TPs. A TP can be a serving or neighboring TP. A TP is interchangeably referred to as a Remote Radio Head (RRH) and Remote Radio Unit (RRU) or in the case of single TP as a base station or even all network nodes in a shared cell can be termed as TPs.

While the systems and methods disclosed herein are applicable to any wireless communications technology, embodiments of the present disclosure are described in the context of 3GPP LTE technology. In other words, the embodiments described below focus on 3GPP LTE. As such, 3GPP LTE terminology is sometimes used. However, the embodiments are applicable to any Radio Access Technology (RAT) or multi-RAT system, where the wireless device receives and/or transmits signals (e.g., data) e.g. LTE Frequency Division Duplexing (FDD)/Time Division Duplexing (TDD), Wideband Code Division Multiple Access (WCDMA)/High Speed Packet Access (HSPA), Global System for Mobile Communications (GSM)/GSM Enhanced Data Rates for GSM Evolution (EDGE) Radio Access Network (GERAN), Wi-Fi, Wireless Local Area Network (WLAN), Code Division Multiple Access 2000 (CDMA2000), etc.

A problem with using DRS features in a beamformed system is that the number of available DRS resources is insufficient since each node may have a large number of possible transmit beams and each transmit beam is associated with a unique DRS resource. In the beamformed system, the network node may have a large number of antennas, which can be used to generate several transmit beams in the same cell. One solution to providing a unique DRS resource for each transmit beam is to increase the number of DRS resources. However, increasing the number of DRS resources in the beamformed system will significantly increase signaling overhead due to a potentially large number of transmit beams.

Embodiments of the present disclosure address the aforementioned problems in a beamformed system. Embodiments of the present disclosure are directed to signaling, from a network node to a UE, information about transmit beams (aka transmission beams) used for transmitting the same DRS signal(s) (i.e., transmit beams using the same DRS resource) using two or more transmit beams in different time resources. This signaling allows the UE to adapt its measurement procedure when doing measurements on DRS signal(s), e.g. averaging of samples used for obtaining the results. The UE may also signal the time instant when the DRS measurement was made to accompany the DRS based (CSI-RSRP) measurements and an identifier of the DRS configuration associated with the DRS measurement, such as a DRS index (which may, in some embodiments, be a CSI-RS ID that identifies a CSI-RS configuration).

The measurement performance is enhanced as a result of beam specific measurements even when a large number of beams are used by the network node. This in turns enhances the UE mobility performance.

The density of reference signal structures that are developed for regular deployments with existing systems such as 3GPP LTE may be high such that there is a lot of unnecessary interference created when deployments become dense. Reference signals may be transmitted even when there is no data being sent to UEs.

A set of reference signals that are sent with much lower density in time have been introduced in 3GPP with the intention being for this set of reference signals to be used for small cells. Such signals are referred to as DRS signals (aka discovery signals or DRSs) and procedures associated with them are referred to as DRS procedures or discovery procedures.

Another motivation for the DRS signals/procedures is to facilitate the efficient measurement of received signal strength and quality (referred to in 3GPP as RSRP and RSRQ) for different TPs within a cell. These TPs may be geographically separated (i.e., in separate geographic locations) but perform coordinated transmissions as a logical single cell entity.

In the present disclosure, a new application of DRS signals is used, where different DRS signals are used for different transmit beams transmitted from the same TP. A transmit beam is generated by an array of antenna elements, where the same signal is transmitted from the antenna elements but with different adaptive phase shifts in order to steer the transmit beam in the desired direction while reducing interference towards other directions.

A TP can in principle generate an arbitrarily large set of beams, or a finite set of beams can also be used. In general, the array of antenna elements may be two or three dimensional and the set of transmit beams may have pointing directions in azimuth and elevation, so called two-dimensional (2D)-beamforming.

Advantages of embodiments of the present disclosure are readily identifiable to those of ordinary skill in the art. These advantages include, but are not limited to:

- Allowing for a much larger set of transmit beams (DRSs) to be used in the system, which is useful when a dense set of nodes, each employing beamforming, is used.
- The solution enables the UE to know whether the transmit beams are the same or different in different time resources, e.g. in different DRS occasions. This enables the UE to adapt one or more measurement procedures.

Figure 6:
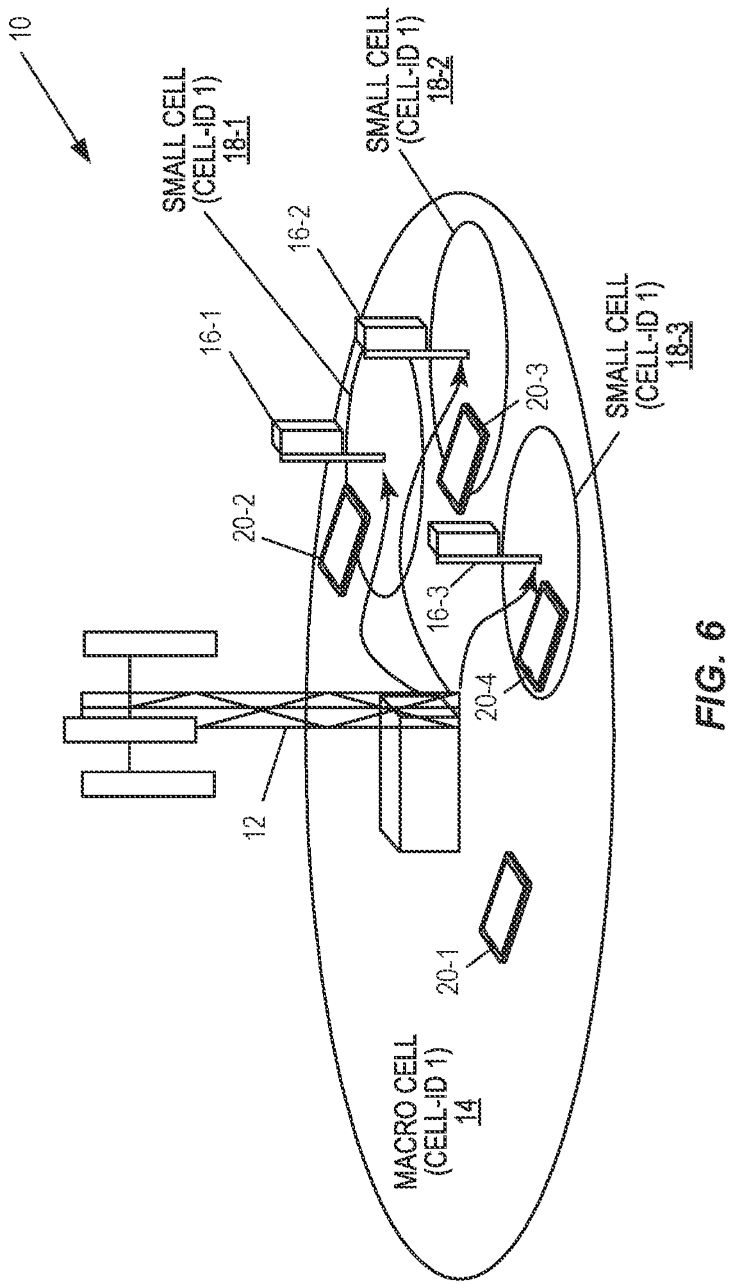
FIG. 6 illustrates one example of a cellular communications network in which embodiments of the present disclosure may be implemented.

Systems and methods relating to transmission of DRSs by a TP on multiple transmit beams are disclosed. In addition, systems and methods relating to performing measurements on DRS signals and adapting measurement procedures based on information relating to DRS transmission configuration are also disclosed. In this regard, FIG. 6 illustrates one example of a cellular communications network 10 in which embodiments of the present disclosure may be implemented. Note that the cellular communications network 10 is only one example and is to be understood as being non-limiting. As illustrated, the cellular communications network 10 includes a macro node 12 (e.g., a base station such as, e.g., an eNB) serving a macro cell 14 and a number of RRHs 16-1 through 16-3 (generally referred to herein collectively as RRHs 16 and individually as RRH 16) serving respective small cells 18-1 through 18-3 (generally referred to herein collectively as small cells 18 and individually as small cell 18). The cellular communications network 10 is a shared cell deployment in which the macro cell 14 and the small cells 18 share the same cell Identity (ID) (e.g., the same Physical Cell ID (PCI)). The macro node 12 and the RRHs 16 provide radio access to a number of wireless devices 20-1 through 20-4 (generally referred to herein collectively as wireless devices 20 and individually as wireless device 20).

With respect to a wireless device 20, the cells 14 and 18 may be on a serving carrier (i.e., be serving cells of the wireless device 20) or a non-serving carrier (i.e., be non-serving cells of the wireless device 20). Examples of serving carriers are a Primary Component Carrier (PCC), also known as a Primary Cell (PCell), and a Secondary Component Carrier (SCC), also known as a Secondary Cell (SCell), in Carrier Aggregation (CA) (aka multi-carrier), a Primary Secondary Component Carrier (PSCC), and a SCC in Dual Connectivity (DC). Examples of non-serving carriers are inter-frequency carriers, inter-RAT carriers, etc. Note that measurements on non-serving carriers can be performed using measurement gaps or without measurement gaps.

According to some embodiments of the present disclosure, one or multiple TPs (e.g., one or more macro nodes 12 and/or one or more RRHs 16) each transmit multiple beams (transmit beams) and each transmit beam is associated with a DRS resource. Currently, in 3GPP LTE, only 96 unique DRS resources are supported in Release 12 (Rel-12), and Rel-12 has been designed for a network with a rather small number of TPs in a given area with one DRS resource per TP. An example of a smaller set of TPs is 2 or 3. In particular, as discussed above, considering that a DRS occasion may be up to 5 subframes long in an FDD frame structure, the largest possible number of CSI-RS RE configurations is 96. This means that the largest possible number of unique DRS resources is 96. Further, it should be noted that, at least in some embodiments, only CSI-RS is beamformed (i.e., PSS, SSS, and CRS may not be beamformed) while, in other embodiments, both CSI-RS (if configured) and one or more other DRS signals (e.g., PSS, SSS, and/or CRS) are beamformed.

If each TP has multiple transmit beams, there is a need for even more than 96 DRS resources. Embodiments of the present disclosure relate to reusing DRS resources in time such that the DRS signals for a particular DRS resource with index Q are transmitted in a transmit beam A at time instant A and the same DRS signals (for the same DRS resource with index Q) are transmitted in another transmit beam B, different from transmit beam A, at another time instant B. The same DRS signals (i.e., the DRS signals corresponding to the same DRS resource) may comprise DRS signals for the same identifier, e.g. a PSS, SSS or CRS for the same PCI (where a particular PCI is mapped to a particular PSS, SSS, or CRS as will be appreciated by one of ordinary skill in the art), a CSI-RS for the same identifier of the TP transmitting the CSI-RS, etc.

This transmission of the same DRS signals on at least two different transmit beams at two different times (i.e., in two different time resources) is termed herein as a pattern. The pattern is more specifically referred to herein as a DRS transmit beam pattern. Within the DRS transmit beam pattern, the same DRS resource is used (i.e., the same DRS signals are transmitted so that the PSS, SSS, and CSI-RS (if configured) occupy the same resource elements in the subframe containing DRS, but in the two different subframes e.g. with same cell ID, TP ID, etc.). The embodiments are applicable for the DRS transmission pattern comprising of any number of transmit beams, e.g. transmit beams A, B, C, D, E, and so on.

A DRS transmit beam pattern comprises the transmission of the same one or more DRS signals in at least two different transmit beams (e.g., A and B) in at least two different time resources (e.g., two different DRS occasions). The DRS transmit beam pattern is also characterized by a reference time parameter. Examples of the reference time parameter for the DRS transmit beam pattern are a starting time of the pattern, a length of the pattern in time, an ending time of the pattern, etc. The starting time of the pattern can be expressed in terms of a frame number or an absolute or global reference time such as Global Navigation Satellite System (GNSS) reference time (e.g., Global Positioning System (GPS) reference time). An example of a frame number as the reference time is a System Frame Number (SFN), which is repeated with a cycle (e.g., after every 1024 radio frames). Therefore, the SFN may vary from 0 to 1023. For example, a starting reference time of a pattern can be configured by a network node or can be predefined. Examples of predefined SFNs are SFN=0, SFN=512, etc.

As an example, the pattern of beams A and B using the same DRS signals are transmitted in two successive time resources and are repeated in subsequent time resources, i.e. in subsequent DRS occasions. Typically, the beams with the same characteristics (e.g., direction, beam width, etc.) are repeated periodically. For example, assume that the same DRS signals can be transmitted in four different beams (namely A, B, C, and D) in four consecutive DRS occasions (namely T0, T1, T2, and T3, respectively). As an example, each DRS occasion contains 1 subframe and each DRS occasion occurs periodically once every 40 ms. The same DRS signals (e.g., PSS/SSS/CRS, CSI-RS, etc.) are transmitted in the same direction as transmit beams A, B, C, and D in the subsequent DRS occasions, namely T4, T5, T6, and T7, respectively. This is an example of a symmetric periodic pattern with a period of 4 DRS occasions and where within each pattern period all possible beams are transmitted with equal probability and the contents of the pattern is the same in all pattern periods.

An example of a symmetric periodic DRS transmit beam pattern is expressed below by (1) and (2):

$$\text{DRS occasions: } [\{T0,T1,T2,T3\},\{T4,T5,T6,T7\} \ldots ] \quad (1)$$

$$\text{Beams/occasion: } [\{A,B,C,D\},\{A,B,C,D\} \ldots ] \quad (2)$$

Another example of a symmetric periodic DRS transmit beam pattern is expressed below by (3) and (4). In this case, each beam is repeated over two consecutive DRS occasions within a period of the pattern equal to 8.

$$\text{DRS occasions: } [\{T0,T1,T2,T3,T4,T5,T6,T7\},\{T8,T9,T10,T11,T12,T13,T14,T15\}, \ldots ] \quad (3)$$

Beams/occasion: [{A,A,B,B,C,C,D,D},{A,A,B,B,C,C,D,D}, . . . ] (4)

The periodic pattern can also be asymmetric (asymmetric periodic DRS transmit beam pattern) where the pattern period is the same but contents of patterns in different periods can be different. An example of such a pattern with a period of 6 DRS occasion is expressed below by (5) and (6):

DRS occasions: [{T0,T1,T2,T3,T4,T5},{T6,T7,T8,T9,T10,T11} . . . ] (5)

Beams/occasion: [{A,A,B,B,C,D},{C,D,D,D,A,B} . . . ] (6)

In some embodiments the DRS transmit beam pattern can also be aperiodic where the period can change after every pattern. An example of such a pattern is expressed below by (7) and (8):

DRS occasions: [{T0,T1,T2},{T3,T4,T5,T6,T7},{T8,T9,T10,T11} . . . ] (7)

Beams/occasion: [{A,B,C},{B,C,D,D,A},{C,D,D,D,A} . . . ] (8)

In yet another example of a DRS transmit beam pattern, different beams using the same DRS resource (i.e., transmitting the same DRS signal(s)) are used in different time resources (e.g., different subframes) within the same DRS occasion. In one implementation, the same DRS transmit beam pattern can be used in different DRS occasions. However, in some implementations, a different DRS transmit beam pattern can also be used in different DRS occasions. An example of such a DRS transmit beam pattern (i.e., different beams within the same DRS occasion) is expressed below by (9) and (10). In this example, it is assumed that one DRS occasion contains 4 time resources (e.g., 4 subframes) containing 4 different beams: A, B, C, and D:

Time resources within one DRS occasion: {t0,t1,t2,t3} (9)

Beam/time resource: {A,B,C,D} (10)

In yet another example of a DRS transmit beam pattern within a DRS occasion, different beams on the same DRS resource are used in different time resources (e.g., different subframes) within the same DRS occasion but some of them are repeated. An example of such a DRS transmit beam pattern is expressed below by (11) and (12). In this example, it is assumed that one DRS occasion contains 6 time resources (e.g., 6 subframes) containing 4 different types of beams: A, B, C, and D. However, two of the 4 beams are transmitted twice:

Time resources within one DRS occasion: {t0,t1,t2,t3,t4,t5} (11)

Beam/time resource: {A,B,B,C,D,D} (12)

In some embodiments, it is up to a network node (e.g., the macro node 12) to decide whether or not the DRS signals should be transmitted using a DRS transmit beam pattern or without a DRS transmit beam pattern (i.e., like in conventional or existing systems). When using a DRS transmit beam pattern for DRS transmission, it is also up to the network node to decide which type of DRS transmit beam pattern is to be used for transmitting the DRS signals. The DRS signals are eventually used by the wireless device 20 for performing measurements on the DRS signals.

According to some embodiments, a network node may decide to generate a DRS transmission pattern (i.e., to transmit DRS signals according to a DRS pattern) and also decide the type of DRS transmission pattern based on one or more of the following criteria:

- A criterion related to reception of a request from another network node, e.g. a TP is requested to use a DRS transmission pattern and/or a type of DRS transmission pattern by a serving eNB;
- A criterion related to when beam forming is being used or expected to be used by the network node (e.g., use a DRS transmission pattern when beam forming is being used or expected to be used);
- A criterion related to the number of transmit beams being used or expected to be used by the network node (e.g., use a DRS pattern when the number of beams being used or expected to be used by the network node is larger than a threshold);
- A criterion related to the number of radio nodes in the coverage area (e.g., use a DRS pattern when there is large number (e.g., more than a threshold number) of radio nodes in the coverage area, e.g. a large number of TPs per shared cell, i.e. with the same PCI);
- A criterion related to the number of available DRS resources and/or the number of unavailable DRS resources (e.g., use a DRS transmission pattern when there is a limited number (e.g., less than a threshold number) of different DRS resources that are available or when there is some threshold number of DRS resources that cannot be used);
- A criterion related to the deployment scenario (e.g., use a DRS transmission pattern in a certain deployment scenario(s), e.g. a cell serving a high rise building where the wireless devices 20 are distributed in both azimuth and vertical directions);
- A criterion related to system load (e.g., use a DRS transmission pattern when system load is high, e.g. a large number of wireless devices 20 in the cell);
- A criterion related to measurement performance: To enable the wireless device 20 to achieve better measurement accuracy, the network node may use a symmetric periodic pattern with more than one repetition of the same beam in the same pattern period; and/or
- A criterion related to DRS transmission parameters. For example, if DRS bandwidth is larger than a threshold (e.g., 50 Resource Blocks (RBs) or more) the network node may use a symmetric periodic pattern with no repetition of the same beam in the same pattern period.

In some embodiments, a network node (e.g., the macro node 12), when initiating DRS transmission according to a DRS transmission pattern, may also transmit information to one or more wireless devices 20. The information is used to inform the wireless device(s) 20 that the network node is transmitting or expected to transmit DRS according to a DRS transmission pattern (generally) or according to a specific transmission pattern. The network node, when stopping DRS transmission according to the DRS transmission pattern, may also send corresponding information (i.e., about ceasing transmission of DRS signals according to the DRS transmission pattern) to the wireless device(s) 20.

In one example, the information may comprise an indicator that indicates whether the network node is:

- transmitting (or expected to transmit) DRS signals with (according to) a DRS transmit beam pattern, or
- stopping (or expected to stop) an ongoing DRS transmission with (according to) a DRS transmit beam pattern.

In another example, the information may provide at least some indication about the DRS transmit beam pattern being used or expected to be used or being stopped for transmitting DRS signals. Examples of such information about the pattern are:

- A predefined identifier of one of multiple predefined DRS transmit beam patterns and a pattern reference time such as a starting time of the pattern, e.g. SFN=4;
- Partial or complete information about the pattern itself. This may comprise one or more of: a pattern reference time such as a starting time of the pattern, a pattern periodicity, a type of pattern (e.g., periodic or aperiodic, etc.), a number of distinct or different beams used in the same pattern for the same DRS resource, etc.

Any of the above mentioned information may be associated with one or multiple cells, e.g. for one or more serving cells and/or for one or more neighbor cells of a wireless device 20. For example, the network node may signal information for multiple cells to the wireless device 20, thereby enabling the wireless device 20 to measure on multiple cells. In some embodiments, the signaled information for each cell may also include a cell ID and/or cell related information, e.g. PCI, TP ID, etc. In some embodiments, the signaled information may be common for multiple cells, e.g. the same information is applicable for all cells on the same carrier frequency. In some embodiments, the signaled information may be common for two or more carrier frequencies, e.g. the same information is applicable for all cells on the serving carrier frequency and for all cells on one or more non-serving carrier frequencies such as inter-frequency carriers.

The network node may transmit the aforementioned information to the wireless device(s) 20 using higher layer signaling such as Radio Resource Control (RRC) or Media Access Control (MAC) signaling. The network node may transmit this information in a broadcast message for all or a group of wireless devices 20 in the respective cell or to specific wireless devices 20 in wireless device specific (aka dedicated) messages. The wireless devices 20 may use this information to adapt their measurement procedure(s), as described below.

According to some embodiments of the present disclosure, the network node, when initiating a DRS transmission according to a DRS transmission pattern or when ceasing an ongoing DRS transmission according to a DRS transmission pattern, may also transmit corresponding information to one or more other network nodes, e.g. neighboring network nodes. The contents of the information about starting or stopping the DRS transmit beam pattern can be the same as transmitted to the wireless device(s) 20, which is described above. The network node receiving this information may use this information for one or more tasks. Examples of such tasks are: to create its own DRS transmission pattern; to decide whether or not to transmit DRS signals according to the DRS transmission pattern; and to inform the wireless devices 20 in the cell about the DRS transmission pattern used in neighboring network nodes, etc.

Figure 7:
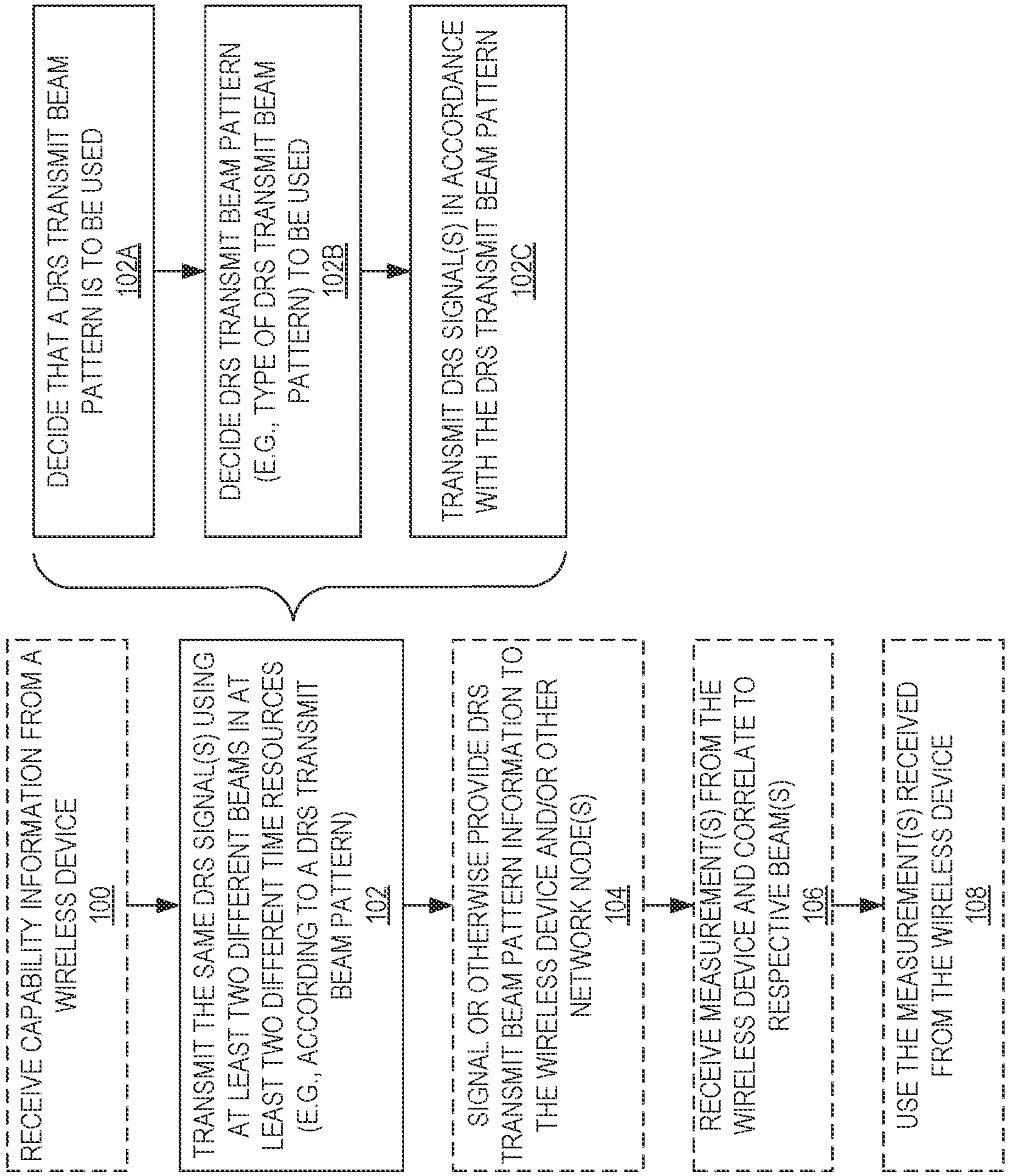
FIG. 7 is a flow chart that illustrates the operation of a Transmission Point (TP) according to some embodiments of the present disclosure.

FIG. 7 is a flow chart that illustrates the operation of a TP (e.g., the macro node 12 or one of the RRHs 16 of FIG. 6) according to some embodiments of the present disclosure. The process of FIG. 7 illustrates at least some of the embodiments described herein. Note that dashed boxes represent optional steps that may or may not be included in the process, depending on the embodiment. As illustrated, in some embodiments, the TP receives capability information from one or more wireless devices 20 that indicates whether the wireless devices 20 have the capability to, e.g., perform measurements on DRS signals transmitted according to a DRS pattern (step 100).

The TP transmits the same DRS signal(s) using at least two different transmit beams in at least two different time resources (e.g., according to a DRS transmit beam pattern), as described above (step 102). In some embodiments, the transmission in step 102 includes deciding whether a DRS transmit beam pattern is to be used (step 102A), deciding on a DRS transmit beam pattern to use (e.g., the type of DRS transmit beam pattern) (step 102B), and transmitting the same DRS signal(s) on at least two different beams in at least two different time resources in accordance with the DRS transmit beam pattern (step 102C), as described above.

Figure 8:
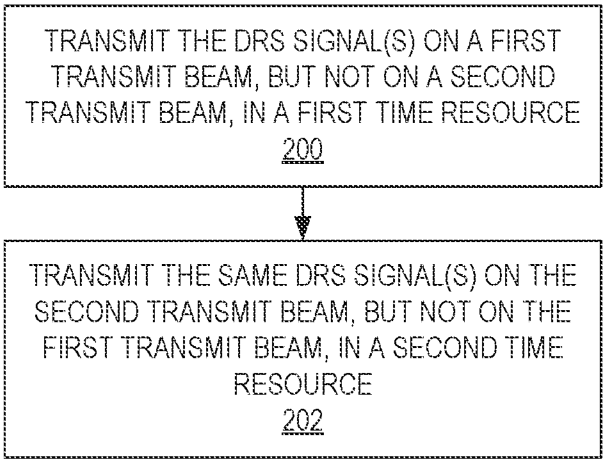
FIG. 8 is a more detailed illustration of a process for transmitting the same DRS signal(s) on different transmit beams in different time resources according to some embodiments of the present disclosure.

As illustrated in FIG. 8, step 102 or step 102C includes, at least in some embodiments, transmitting the DRS signal (s) on a first transmit beam, but not on (at least) a second transmit beam, in a first time resource (e.g., in a first DRS occasion) (step 200). The TP transmits the same DRS signal(s) on the second transmit beam, but not (at least) the first transmit beam, in a second time resource (e.g., a second DRS occasion (step 202). The first and second transmit beams are different transmit beams (i.e., have different beam directions), and the first and second time resources are different time resources (e.g., different DRS occasions). Additional similar steps may be performed if more than two transmit beams and/or more than two time resources are included in the DRS transmit beam pattern. Using this process, when, for example, transmitting the DRS signal(s) on the first transmit beam in the first time resource, the TP does not transmit the same DRS signal(s) on the second transmit beam and potentially not on any other transmit beam. In particular, when transmitting the DRS signal(s) on the first transmit beam in the first time resource, the TP does not transmit the same DRS signal(s) on any other transmit beam that would negatively impact the ability of the wireless device(s) to perform measurements on the DRS signal(s) transmitted on the first transmit beam. In the same manner, when transmitting the same DRS signal(s) on the second transmit beam in the second time resource, the TP does not transmit the same DRS signal(s) on the second transmit beam and potentially not on any other transmit beam.

Returning to FIG. 7, in some embodiments, the TP signals or otherwise provides information related to DRS transmission configuration to the wireless device(s) 20 and/or another network node (step 104), as described above. In some embodiments, the TP receives one or more measurements from the wireless device 20 based on the transmitted DRS signal(s) and correlates the measurement(s) to the respective transmit beam(s) (step 106). As discussed below in detail, in some embodiments, an indication of a time resource for which the measurement(s) were obtained is provided with or in association with the measurement(s). This timing information can then be used together with the DRS transmit beam pattern to determine the transmit beam (s) to which the measurement(s) apply. Examples of measurements which can be received from the wireless device 20 are cell search, a.k.a. cell identification, measurements such as RSRP, RSRQ, CSI-RSRP, CSI-RSRQ, CQI, CSI, UE reception-transmission time difference, SINR, DRS-SINR, etc.

In some embodiments, the TP uses the measurement(s) (step 108). For example, the TP may use the measurement(s) received from the wireless device 20 by selecting one of the reported beams from the wireless device 20 (identified by the DRS identity) and transmitting the downlink shared data channel to the wireless device 20 using the same beam as the beam used for the DRS beam for which the wireless device 20 has provided a measurement report.

Figure 9:
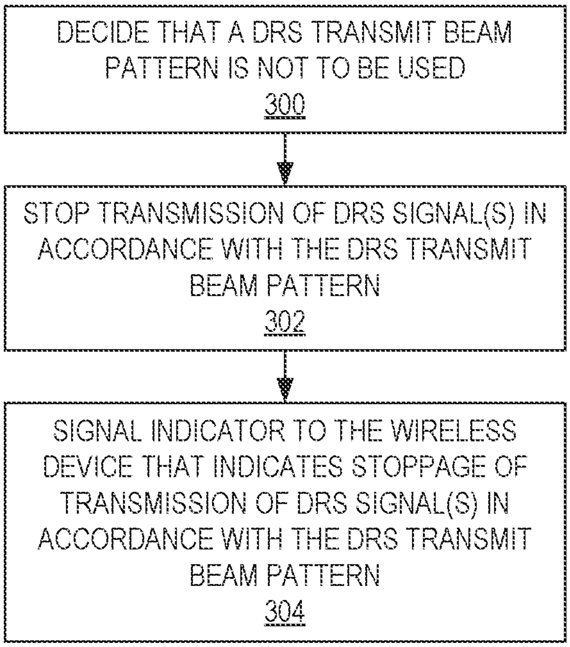
FIG. 9 is a flow chart that illustrates the operation of a TP according to some other embodiments of the present disclosure.

FIG. 9 is a flow chart that illustrates the operation of a TP according to some embodiments of the present disclosure. As illustrated, the TP decides that a DRS transmit beam pattern is not to be used for transmission of DRS signals (step 300). Upon making this decision, the TP stops transmission of the DRS signals in accordance with the DRS transmit beam pattern (step 302) and signals an indicator to the wireless device(s) 20 that indicates the stoppage (step 304), as described above.

Embodiments related to the operation of a wireless device 20 are also disclosed. In particular, systems and methods are disclosed that relate to performing measurements, at the wireless device 20, using DRS signal(s) transmitted by a TP according to the embodiments described above (e.g., according to a DRS transmit beam pattern). In some embodiments, a method of operation of the wireless device 20 comprises the following two steps:

- The wireless device 20 obtains at least information about (i.e., related to) the DRS transmission configuration, which comprises at least information about one or more DRS transmit beam patterns used in one or more cells (i.e., information about the pattern as described above); and
- The wireless device 20 uses the obtained information for performing one or more measurements on one or more DRS signals.

After performing one or more measurements, the wireless device 20 may use the one or more measurements for one or more radio operation tasks. Examples of such radio operation tasks are:

- Performing cell change. Examples of cell change are handover, cell selection, cell reselection, RRC connection release with redirection, etc.;
- Transmitting the measurement results to a network node (e.g., the TP). The wireless device 20 may send the measurement results using one or more of the following mechanisms: periodically, event triggered basis, and event triggered periodic basis;
- Transmitting the measurement results to another wireless device 20 if the wireless devices 20 are D2D capable (aka wireless devices 20 capable of Proximity Services (ProSes)). The wireless device 20 may send the measurement results using one or more of the following mechanisms: periodically, event triggered basis, and event triggered periodic basis;
- Using the measurement results for determining the position of the wireless device 20 (i.e., determining wireless device position).

The obtained information about the DRS transmission configuration may also contain additional data or contents related to DRS. For example, the additional information may be related to physical resources in which DRS signals are transmitted. Examples of physical resources are time resources containing DRS signals (e.g., the number of subframes per DRS occasion), bandwidth of the DRS signals, measurement bandwidth of DRS signals, periodicity of DRS occasions, etc. The wireless device 20 may obtain any information about the DRS transmission configuration by one or more of the following means:

- In one exemplary implementation, the wireless device 20 may obtain the information by receiving the information from a network node (e.g., the TP) as described above;
- In another exemplary implementation, the wireless device 20 may obtain the information based on one or more predefined rules and/or information;
- In yet another exemplary implementation, the wireless device 20 may obtain the information autonomously. For example, the wireless device 20 may autonomously detect whether or not beams are the same or are different in different DRS occasions and/or in different time resources within the same DRS occasion. The wireless device 20 may detect this by, for example, detecting the Angle of Arrival (AoA) of signals. In case of different beams, the wireless device 20 may detect a change in the AoA of signals and/or the signal strengths in different DRS occasions and/or time resources per DRS occasion.

If the wireless device 20 autonomously detects one or more parameters related to the DRS transmission configuration (e.g., the number of beams per DRS occasion, etc.), then the wireless device 20 may also transmit such autonomously obtained information to the network node and/or to another wireless device 20.

In order to perform one or more measurements on DRS signals, the wireless device 20 may adapt one or more measurement procedures based on the obtained information related to the DRS transmission configuration. For example, the adaptation of one or more measurement procedures will allow the wireless device 20 to perform measurements when the same DRS signal(s) is used in different beams in different time resources, e.g. different DRS occasions and/or in different time resources in the same DRS occasion. The adaptation may also depend on the type of information related to DRS transmission configuration obtained by the wireless device 20. The adaptation may also depend on the type of DRS transmit beam pattern used by one or more cells on which the wireless device 20 performs one or more measurements.

Some examples of such adaptations of measurement procedures in the wireless device 20 are now described. One example of such as adaptation is switching between a first measurement mode and a second measurement mode based on the obtained information related to the DRS transmission configuration. In one example, in the first measurement mode, the wireless device 20 uses a first number of measurement samples to be averaged over a Layer 1 (L1) measurement period to obtain measurement results, whereas, in the second measurement mode, the wireless device 20 uses a second number of measurement samples to be averaged over the L1 measurement period to obtain measurement results. For example, if a DRS transmit beam pattern is used, then the wireless device 20 uses the first measurement mode where only one sample is used for obtaining the measurement result. But if a DRS transmit beam pattern is not used, then the wireless device 20 uses the second measurement mode where two or more samples in different DRS occasions are used for obtaining the measurement result. In another example of the first measurement mode, the wireless device 20 may use two or more measurement samples but only on DRS signals transmitted using the same beam in different time resource and/or DRS occasions. In yet another example, when using the first measurement mode, the wireless device 20 performs measurement over the L1 measurement period, which is shorter than the L1 measurement period used for doing measurements with the second measurement mode.

In some embodiments, the wireless device 20 associates the results of measurements with at least the timing related to the DRS transmission. For example, after the measurement when the wireless device 20 sends the measurement report to a network node (e.g., the TP such as the macro node 12 (e.g., eNB)), the wireless device 20 reports the measured value, the DRS index Q, plus the time instant of the measurement (A or B). In some embodiments, the DRS index comprises an identifier for a CSI-RS such as a MeasCSI-RS-Id-r12 information element 3GPP Technical Specification (TS) 36.331 Section 6.3.5 (version 12.5.0). In one embodiment, the time instant is given by the SFN or by any other frame numbering or group of multiple frame numbering. In one aspect of this embodiment, the reported time instant is the start time instant (or end time instant), in case the same DRS is transmitted in the same beam at multiple time instants. For example, if DRS signal(s) on which measurement is done and the SFN of that DRS occasion is 4, then the wireless device 20 signals the measurement results as well as at least SFN=4. In another example of this embodiment, the timing instant is complemented by a disabling of the cross-frame or subframe averaging of DRS measurements at the physical layer. This disabling may be signaled to the wireless device 20 by higher layers, such as RRC signaling. This disabling may further set Layer 3 (L3) filtering of the DRS measurements to zero, i.e. setting the variable a in 3GPP Technical Specification (TS) 36.331 (version 12.5.0) Section 5.5.3.2 to a=1. Furthermore, if event triggered DRS reporting is configured, the disabling may also set the time to trigger the event to zero, i.e., set the information element TimeToTrigger from 3GPP TS 36.331 (version 12.5.0) Section 6.3.5 to TimeToTrigger=ms0. In this manner, physical or higher layer filtering of DRS measurements or triggering delays will not increase the time ambiguity of when the measurement occurred, and the network will be better able to identify which beam was transmitted.

As another example of the adaptation that may be performed by the wireless device 20, in some embodiments, the wireless device 20 is allowed to report M measurements of different DRS signals but only M'<M measurements obtained at the same time index. With this solution, the network node (e.g., eNB) may transmit beams from different TPs at different time instants and thus get DRS measurements from multiple TPs. If this constraint would not be applied, the wireless device 20 may only report measurements for beams at the TP closest to the wireless device 20 (i.e., strongest received signal). Alternatively, the network node (e.g., eNB) may transmit DRS beams in different sectors of the cell at different time instants, for the same reasons as for different TPs.

As another example, in some embodiments, the wireless device 20 may adapt its procedure in order to be able to detect and differentiate between different beams using the same DRS resources (i.e., transmitting the same DRS signal (s)) in different time resources, i.e. in different DRS occasions and/or DRS time resources. For example, based on this detection, the wireless device 20 may use the performed measurements to identify a number N of measurements with N most distinct beams, e.g. which have the most distinct direction in vertical and/or azimuth angles. The wireless device 20 may use N such measurements for one or more radio operation tasks, e.g. for cell change, report N number of measurements with N most distinct beams to the network node and/or to another wireless device 20, for positioning, etc.

The wireless device 20 may adapt one or more of the above measurement procedures based on or more of the following:

- Request or indication received from the network node;
- Autonomous decision by the wireless device 20. The wireless device 20 may also perform the adaptation to comply to one or more predefined requirements;
- One or more predefined rules specified in a standard. The predefined rule may also be expressed in terms of one or more predefined requirements. For example, the wireless device 20 may have to adapt one or more measurement procedures in order to meet one or more predefined wireless device requirements related to wireless device measurements (aka measurement requirements), Radio Resource Management (RRM) requirements, mobility requirements, positioning measurement requirements, etc. Examples of wireless device requirements related to wireless device measurements are measurement time, measurement reporting time or delay, measurement accuracy (e.g., RSRP/RSRQ accuracy), number of cells to be measured over the measurement time, etc. Examples of measurement time are L1 measurement period, cell identification time or cell search delay, Cell Global Identity (CGI) acquisition delay, etc.

According to another aspect, the procedure in the wireless device 20 may comprise signaling, to the network node, one or more sets of information related to a capability associated with obtaining a DRS transmit beam pattern and using the DRS transmit beam pattern for one or more measurements. This is due to the fact that all wireless devices 20 may or may not be capable of obtaining and using a DRS transmit beam pattern for measurements or may be capable of obtaining and using only a specific type(s) of DRS transmit beam patterns. Based on such received wireless device capabilities, the network node may decide whether or not to configure the wireless device 20 with a DRS transmit beam pattern. The network node may also use additional information in the wireless device capability to decide the actual DRS transmit beam pattern to be configured in the cell. The network node may also signal the received wireless device capability information to another network node. The network node may acquire the wireless device capability from the wireless device 20 and/or from another network node that contains such information.

Figure 10:
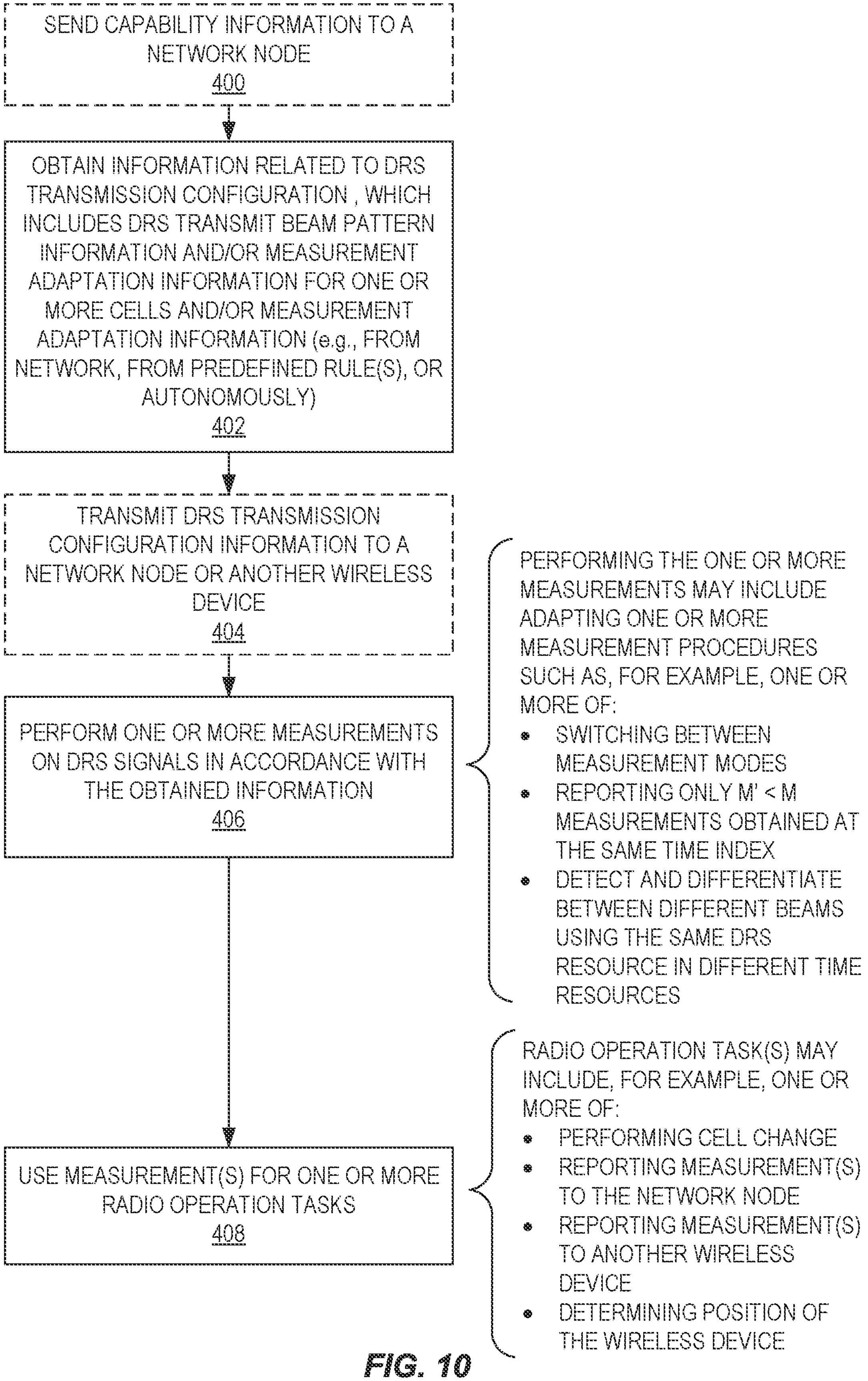
FIG. 10 is a flow chart that illustrates the operation of a wireless device according to some embodiments of the present disclosure.

FIG. 10 is a flow chart that illustrates the operation of a wireless device 20 according to some embodiments of the present disclosure. The process of FIG. 10 illustrates at least some of the embodiments described herein. Note that dashed boxes represent optional steps that may or may not be included in the process, depending on the embodiment. As illustrated, in some embodiments, the wireless device 20 sends capability information to a network node that indicates whether the wireless device 20 has the capability to obtain and use a DRS transmit beam pattern (step 400), as described above.

The wireless device 20 obtains information related to a DRS transmission configuration for one or more cells (step 402). As described above, this information includes DRS transmit beam pattern information and/or measurement adaptation information for one or more cells. The measurement adaptation information may include, for example, an L3 filtering coefficient whose value is set such that DRS measurements made by the wireless device 20 are not averaged and/or a time to trigger parameter whose value is set such that the time to trigger a DRS reporting event in the wireless device 20 is zero. The information may be obtained by the wireless device 20 in any suitable manner such as, for example, from a network node, from a predefined rule(s) and/or predefined information, and/or autonomously. In some embodiments, the wireless device 20 transmits the obtained information or some subset thereof to a network node or another wireless device 20 (step 404).

Based on the obtained information, the wireless device 20 performs one or more measurements on a DRS signal(s) transmitted by one or more TPs, as described above (step 406). Performing the measurement(s) may include adapting one or more measurement procedures. For example, as described above, this adaptation may be switching between two or more measurement modes, reporting only M'<M measurements obtained at the same time instant, and/or detecting and differentiating between different beams using the same DRS resource in different time resources.

The wireless device 20 uses the measurement(s) for one or more radio operation tasks (step 408). As described above, the one or more radio operation tasks may include, for example, performing a cell change, reporting (i.e., transmitting) the measurement(s) to a network node, reporting (i.e., transmitting) the measurement(s) to another wireless device 20, and/or determining the position of the wireless device 20.

Figure 11:
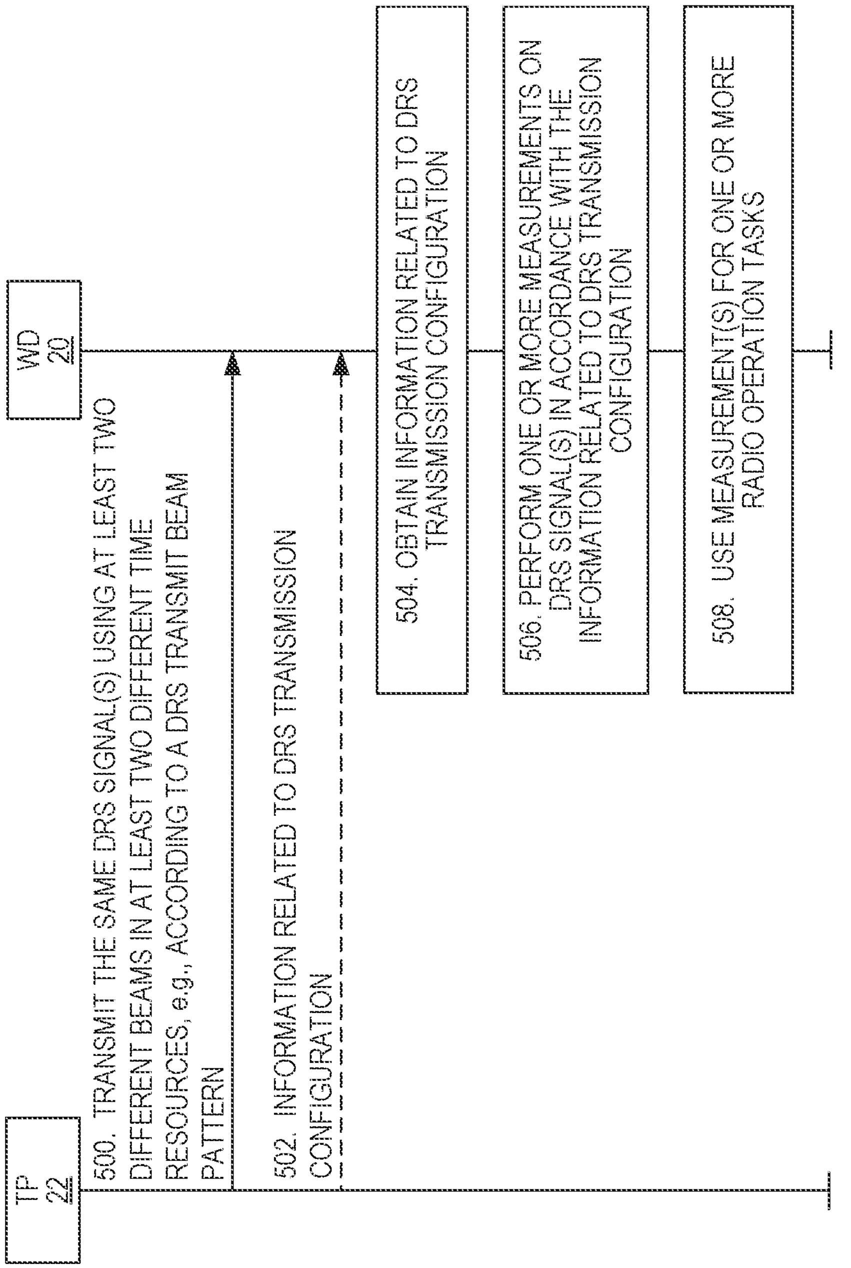
FIG. 11 illustrates the operation of a TP and a wireless device according to some embodiments of the present disclosure.

FIG. 11 illustrates the operation of a TP 22 and a wireless device 20 according to some embodiments of the present disclosure. As illustrated, the TP 22 transmits the same DRS signal(s) using at least two different transmit beams in at least two different time resources, e.g., in accordance with a DRS transmit beam pattern (step 500), as described above. In some embodiments, the TP 22 transmits information related to a DRS transmission configuration for one or more cells to the wireless device 20, as described above (step 502). The wireless device 20 obtains the information related to the DRS transmission configuration (step 504) and, based on this information, performs one or more measurements on the DRS signal(s) transmitted by the TP 22 (step 506). The wireless device 20 then uses the measurement(s), as described above (step 508).

Figure 12:
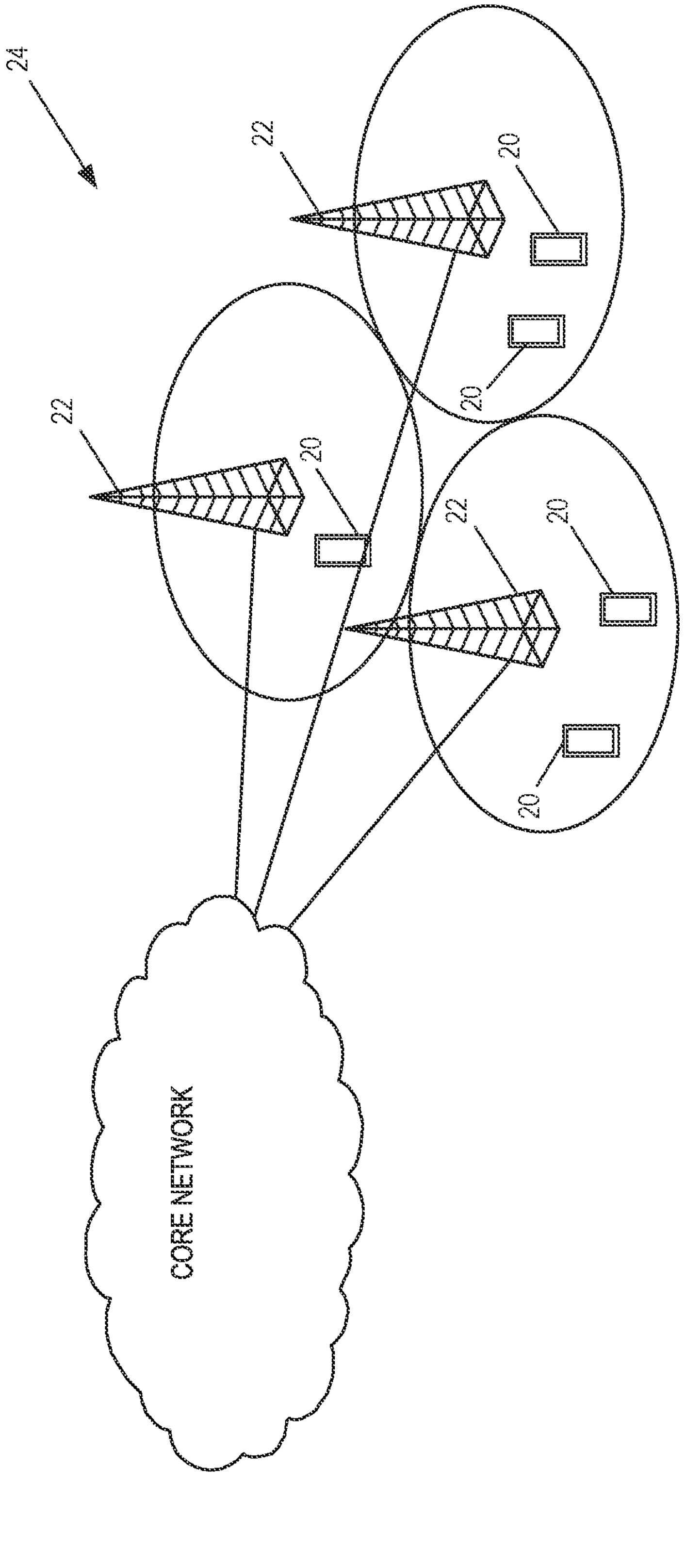
FIG. 12 illustrates another example of a cellular communications network in which embodiments of the present disclosure may be implemented.

Although the described solutions may be implemented in any appropriate type of telecommunication system supporting any suitable communication standards and using any suitable components, particular embodiments of the described solutions may be implemented in an LTE network 24, such as that illustrated in FIG. 12. As shown in FIG. 12, the example LTE network 24 may include one or more instances of wireless devices 20, which are also referred to herein as wireless communication devices 20, (e.g., conventional UEs or MTC/M2M UEs) and one or more TPs 22 (e.g., radio access nodes such as, e.g., the macro node 12 and/or the RRHs 16 of FIG. 6) capable of communicating with the wireless devices 20 along with any additional elements suitable to support communication between the wireless devices 20 or between a wireless device 20 and another communication device (such as a landline telephone). Although the illustrated wireless devices 20 may represent communication devices that include any suitable combination of hardware and/or software, these wireless devices 20 may, in particular embodiments, represent devices such as the example wireless device 20 illustrated in greater detail by FIGS. 13 and 14. Similarly, although the illustrated TPs 22 may represent network nodes that include any suitable combination of hardware and/or software, these nodes may, in particular embodiments, represent devices such as the example TP 22 illustrated in greater detail by FIGS. 15 through 17.

Figure 13:
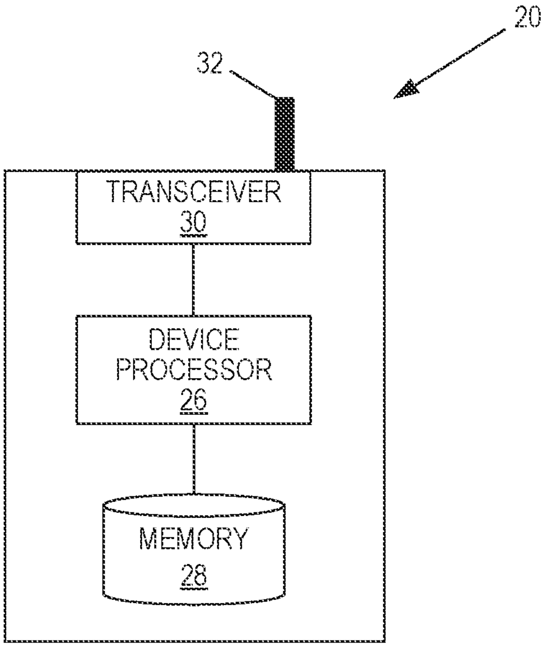
FIGS. 13 and 14 are block diagrams of a wireless device according to some embodiments of the present disclosure.

As shown in FIG. 13, the example wireless device 20 includes a processor 26 (e.g., processing circuitry such as, for example, one or more Central Processing Units (CPUs), one or more Application Specific Integrated Circuits (ASICs), one or more Field Programmable Gate Arrays (FPGAs), and/or the like), memory 28, a transceiver(s) 30, and an antenna(s) 32. In particular embodiments, some or all of the functionality described above as being provided by UEs, MTC or M2M devices, and/or any other types of wireless devices 20 may be provided by the processor 26 executing instructions stored on a computer-readable medium, such as the memory 28 shown in FIG. 13. Alternative embodiments of the wireless device 20 may include additional components beyond those shown in FIG. 13 that may be responsible for providing certain aspects of the device's functionality, including any of the functionality described above and/or any functionality necessary to support the solution described above.

Figure 14:
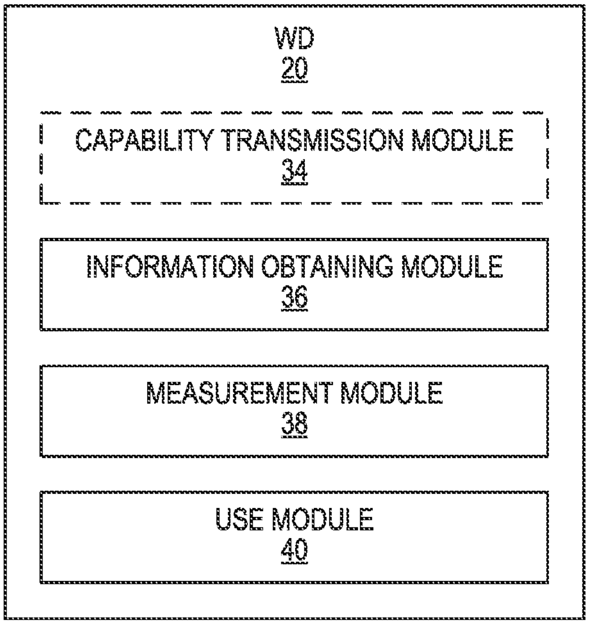

FIG. 14 illustrates the wireless device 20 according to some other embodiments of the present disclosure. As illustrated, the wireless device 20 includes an optional capability transmission module 34, an information obtaining module 36, a measurement module 38, and a use module 40, each of which is implemented in software. The optional capability transmission module 34 operates to transmit capability information to, e.g., a network node, as described above. The information obtaining module 36 operates to obtain information related to DRS transmission configuration, as described above. The measurement module 38 operates to perform measurement(s) in accordance with the obtained information, as described above. The use module 40 operates to use the measurement(s) to perform one or more radio operation tasks, as described above.

Figure 15:
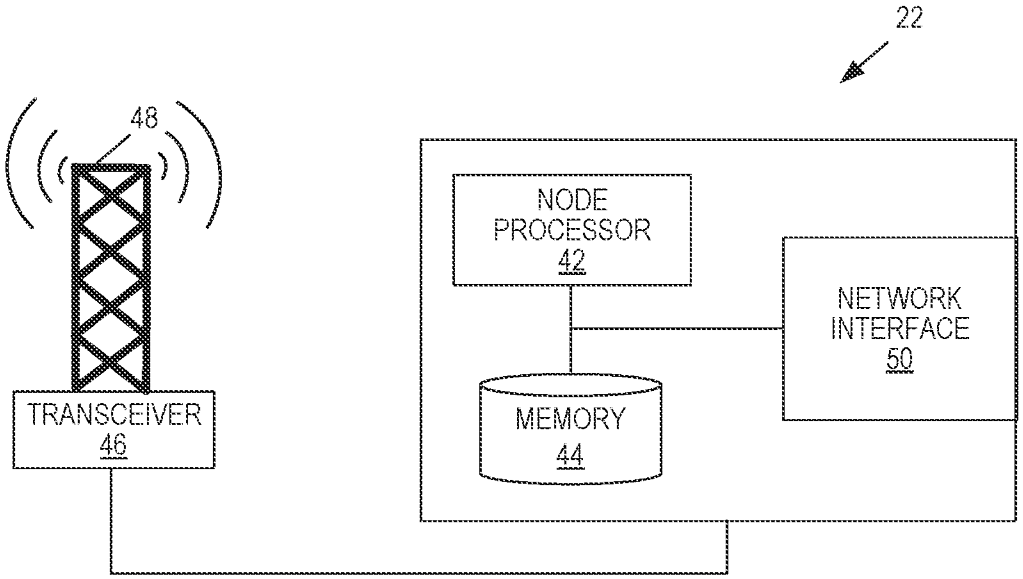
FIGS. 15 through 17 are block diagrams of a TP according to some embodiments of the present disclosure.

As shown in FIG. 15, the example TP 22 (e.g., a radio access node such as the macro node 12 or an RRH 16) includes a processor 42 (e.g., processing circuitry such as, for example, one or more CPUs, one or more ASICs, one or more FPGAs, and/or the like), memory 44, a transceiver(s) 46, and an antenna(s) 48. As discussed above, in the embodiments described herein, the antenna(s) 48 include multiple antennas. In addition, the TP 22 includes a network interface 50 that enables communication with other network nodes (e.g., nodes in the core network). In particular embodiments, some or all of the functionality described above as being provided by a network node may be provided by the processor 42 executing instructions stored on a computer-readable medium, such as the memory 44 shown in FIG. 15. Alternative embodiments of the TP 22 may include additional components responsible for providing additional functionality, including any of the functionality identified above and/or any functionality necessary to support the solution described above.

Figure 16:
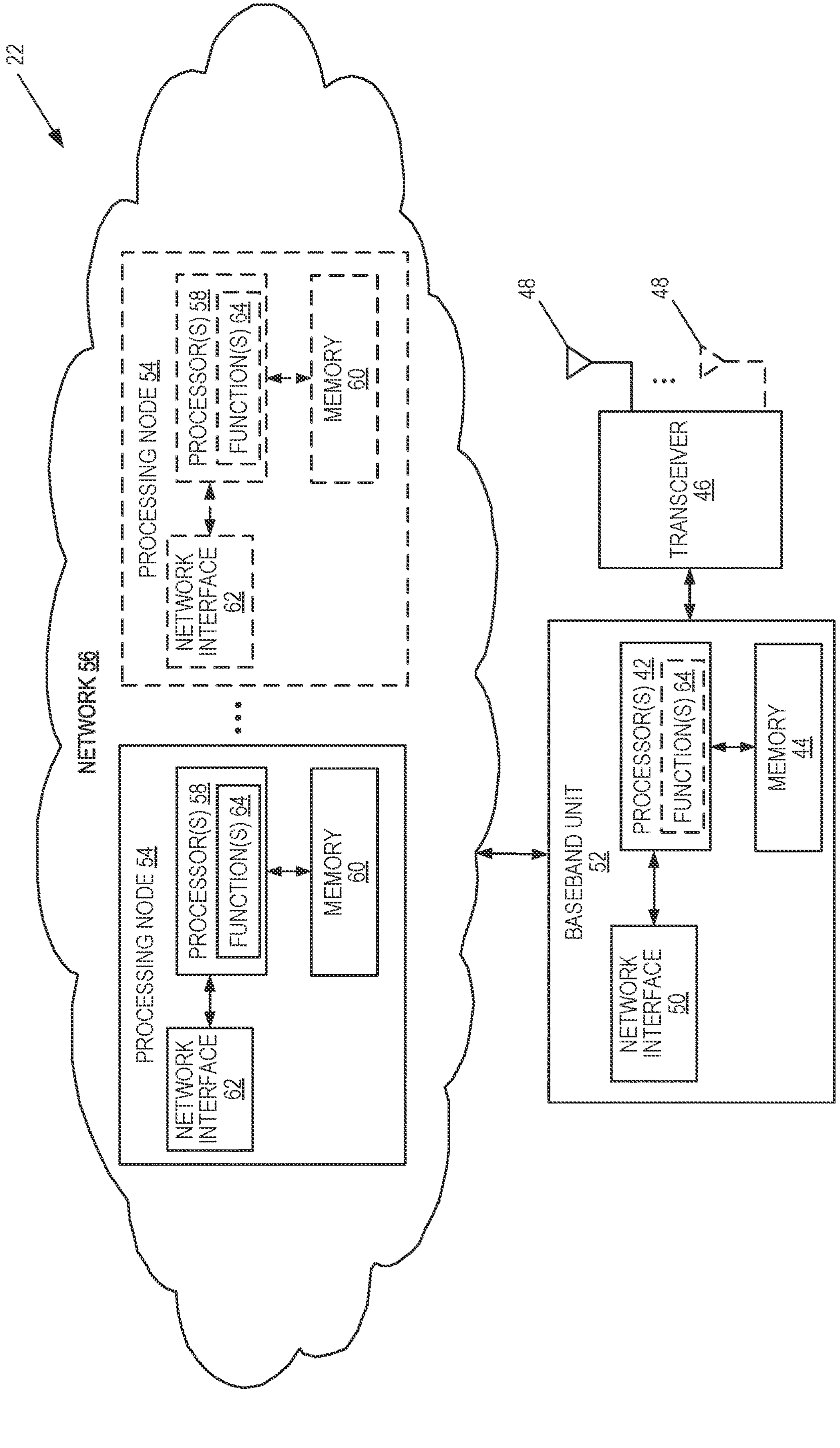

FIG. 16 is a schematic block diagram that illustrates a virtualized embodiment of the TP 22 (e.g., a virtualized embodiment of a network node such as a radio access node) according to some embodiments of the present disclosure. As used herein, a "virtualized" network node is a network node in which at least a portion of the functionality of the network node is implemented as a virtual component (e.g., via a virtual machine(s) executing on a physical processing node(s) in a network(s)). As illustrated, the TP 22 includes the processor 42, the memory 44, and the network interface 50 as well as the transceiver 46 coupled to the antennas 48, as described above. In this example, the processor 42, the memory 44, and the network interface 50 are embodied in a baseband unit 52 that is connected to the transceiver 46 via, for example, an optical cable or the like. The baseband unit 52 is connected to one or more processing nodes 54 coupled to or included as part of a network(s) 56 via the network interface 50. Each processing node 54 includes one or more processors 58 (e.g., CPUs, ASICs, FPGAs, and/or the like), memory 60, and a network interface 62.

In this example, functions 64 of the TP 22 described herein are implemented at the one or more processing nodes 54 or distributed across the baseband unit 52 and the one or more processing nodes 54 in any desired manner. In some particular embodiments, some or all of the functions 64 of the TP 22 described herein are implemented as virtual components executed by one or more virtual machines implemented in a virtual environment(s) hosted by the processing node(s) 54. As will be appreciated by one of ordinary skill in the art, additional signaling or communication between the processing node(s) 54 and the baseband unit 52 is used in order to carry out at least some of the desired functions. Notably, in some embodiments, the baseband unit 52 may not be included, in which case the transceiver 46 communicates directly with the processing node(s) 54 via an appropriate network interface(s).

Figure 17:
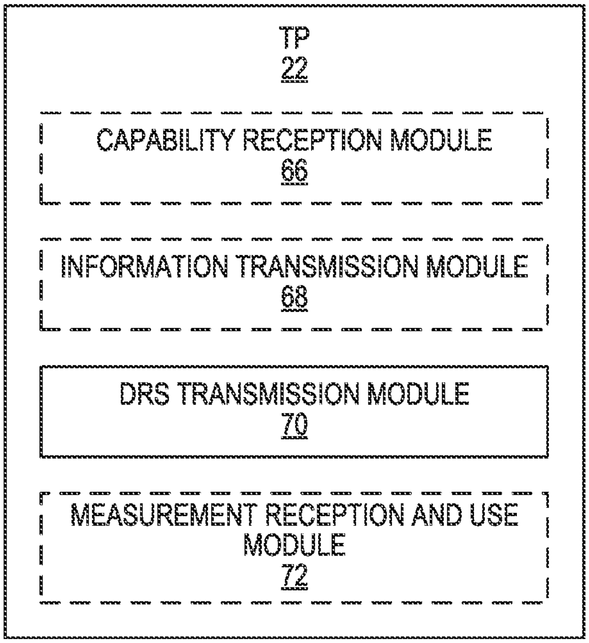

FIG. 17 illustrates the TP 22 according to some other embodiments of the present disclosure. As illustrated, the TP 22 includes an optional capability reception module 66, an optional information transmission module 68, a DRS transmission module 70, and an optional measurement reception and use module 72, each of which is implemented in software. The capability reception module 66 operates to, in some embodiments, receive capability information from the wireless devices 20. The information transmission module 68 operates to transmit information related to DRS transmission configuration for one or more cells to the wireless device(s) 20, as described above. The DRS transmission module 70 operates to transmit DRS signals as described above. The measurement reception and use module 72 operates to receive and use measurements from the wireless devices 20, as described above.

Embodiments of the present disclosure can be implemented by hardware, software, or a combination of hardware and software. Embodiments can be implemented as computer programs tangibly embodied on computer program products, hardware memory, or other structures. Embodiments may be implemented on hardware modules, software modules, or a combination of hardware and software modules.

The following acronyms are used throughout this disclosure.

| | |
|---|---|
| 2D | Two-Dimensional |
| 3GPP | Third Generation Partnership Project |
| AAS | Active Antenna System |
| AoA | Angle of Arrival |
| AP | Access Point |
| ASIC | Application Specific Integrated Circuit |
| BTS | Base Transceiver Station |
| CA | Carrier Aggregation |
| CDMA | Code Division Multiple Access |
| CGI | Cell Global Identity |
| CPU | Central Processing Unit |
| CQI | Channel Quality Indication |
| CRS | Common Reference Signal |
| CSI | Channel State Information |
| CSI-RS | Channel State Information Reference Signal |
| D2D | Device-to-Device |
| DC | Dual Connectivity |
| DMTC | Discovery Measurement Timing Configuration |
| DRS | Discovery Reference Signal |
| DwPTS | Downlink Part of the Special Subframe |
| EDGE | Enhanced Data Rates for Global System for Mobile Communications Evolution |
| eNB | Enhanced or Evolved Node B |
| E-SMLC | Evolved Serving Mobile Location Center |
| FDD | Frequency Division Duplexing |
| FPGA | Field Programmable Gate Array |
| GERAN | Global System for Mobile Communications Enhanced Data Rates for Global System for Mobile Communications Evolution Radio Access Network |

-continued

| | |
|---|---|
| GNSS | Global Navigation Satellite System |
| GPS | Global Positioning System |
| GSM | Global System for Mobile Communications |
| HSPA | High Speed Packet Access |
| ID | Identity |
| LEE | Laptop Embedded Equipment |
| LME | Laptop Mounted Equipment |
| LTE | Long Term Evolution |
| M2M | Machine-to-Machine |
| MAC | Media Access Control |
| MDT | Minimization of Drive Test |
| MIMO | Multiple Input Multiple Output |
| MME | Mobility Management Entity |
| ms | Millisecond |
| MSC | Mobile Switching Center |
| MSR | Multi-Standard Radio |
| MTC | Machine Type Communication |
| NZP | Non-Zero Power |
| O&M | Operations and Management |
| OFDM | Orthogonal Frequency Division Multiplexing |
| OSS | Operations Support System |
| PBCH | Physical Broadcast Channel |
| PCC | Primary Component Carrier |
| PCell | Primary Cell |
| PCI | Physical Cell Identity |
| PDA | Personal Digital Assistant |
| PRB | Physical Resource Block |
| ProSe | Proximity Service |
| PRS | Positioning Reference Signal |
| PSCC | Primary Secondary Component Carrier |
| PSS | Primary Synchronization Signal |
| RAT | Radio Access Technology |
| RB | Resource Block |
| RE | Resource Element |
| Rel-12 | Release 12 |
| RF | Radio Frequency |
| RRC | Radio Resource Control |
| RRH | Remote Radio Head |
| RRM | Radio Resource Management |
| RRU | Remote Radio Unit |
| RSRP | Reference Signal Received Power |
| RSRQ | Reference Signal Received Quality |
| RSSI | Received Signal Strength Indication |
| SCC | Secondary Component Carrier |
| SCell | Secondary Cell |
| SFN | System Frame Number |
| SINR | Signal to Interference plus Noise Ratio |
| SON | Self-Organizing Node |
| SSS | Secondary Synchronization Signal |
| TDD | Time Division Duplexing |
| TP | Transmission Point |
| TS | Technical Specification |
| TTI | Transmit Time Interval |
| UE | User Equipment |
| USB | Universal Serial Bus |
| VCID | Virtual or Configurable Cell Identity |
| WCDMA | Wideband Code Division Multiple Access |
| WLAN | Wireless Local Area Network |
| ZP | Zero Power |

Those skilled in the art will recognize improvements and modifications to the embodiments of the present disclosure. All such improvements and modifications are considered within the scope of the concepts disclosed herein and the claims that follow.

The invention claimed is:

1. A method of operation of a network node in a cellular communications network, comprising:

transmitting, from the network node, a same Discovery Reference Signal (DRS) signal using at least two different transmit beams in at least two different time resources, each transmit beam being characterized by a transmission direction; and receiving, from a wireless device, measurement information based on the DRS signal transmitted via a first transmit beam of the at least two different transmit beams.

2. The method of claim 1 wherein transmitting the same DRS signal using the at least two different transmit beams in the at least two different time resources comprises:

transmitting the DRS signal using a first transmit beam, but not a second transmit beam, in a first time resource; and transmitting the DRS signal using the second transmit beam, but not the first transmit beam, in a second time resource, the second transmit beam being different than the first transmit beam and the second time resource being different than the first time resource.

3. The method of claim 1 wherein the DRS signal comprise a Channel State Information Reference Signal (CSI-RS).

4. The method of claim 3 wherein the DRS signal comprises:

a Common Reference Signal (CRS) for a same Physical Cell Identity (PCI).

5. A method of operation of a wireless device in a cellular communications network, comprising:

obtaining, from a network node, information related to Discovery Resource Signal (DRS) transmission configuration, the information comprising DRS transmit beam pattern information that is related to one or more cells;

performing a measurement on a received DRS signal in accordance with the information related to DRS transmission configuration to generate measurement information; and transmitting the measurement information to the network node associated with the received DRS signal.

6. The method of claim 5 wherein the information related to DRS transmission configuration comprises the DRS transmit beam pattern information, and the DRS transmit beam pattern information comprises an indication of whether at least one network node for the one or more cells is or is expected to transmit DRS signals according to a DRS transmit beam pattern.

7. The method of claim 5 wherein the information related to DRS transmission configuration comprises the DRS transmit beam pattern information, and the DRS transmit beam pattern information comprises an indication of a DRS transmit beam pattern that is or is expected to be used for transmission of a DRS resource for at least one of the one or more cells.

8. The method of claim 5 wherein the information related to DRS transmission configuration further comprises information related to physical resources in which a DRS signal is transmitted.

9. The method of claim 5 wherein obtaining the information related to DRS transmission configuration comprises obtaining the information related to DRS transmission configuration from a network node.

10. The method of claim 5 wherein obtaining the information related to DRS transmission configuration comprises obtaining the information related to DRS transmission configuration based on one or more predefined rules.

11. The method of claim 5 wherein obtaining the information related to DRS transmission configuration comprises obtaining the information related to DRS transmission configuration autonomously.

12. The method of claim 5 wherein obtaining the information related to DRS transmission configuration autonomously comprises autonomously detecting whether different beams are used for transmission in at least one of a group consisting of: different DRS occasions and different time resources within a DRS occasion.

13. The method of claim 11 further comprising transmitting the information related to DRS transmission configuration to at least one of a group consisting of: a network node and another wireless device.

14. A wireless device operable in a cellular communications network, comprising:

a transceiver;

a processor; and memory storing instructions executable by the processor whereby the wireless device is operable to:

obtain information related to Discovery Resource Signal (DRS) transmission configuration from a network node that transmits DRS signals, the information comprising DRS transmit beam pattern information that is related to one or more cells;

perform a measurement on a received DRS signal in accordance with the information related to DRS transmission configuration to generate measurement information; and transmit the measurement information to the network node.

15. The wireless device of claim 14 wherein the information related to DRS transmission configuration comprises the DRS transmit beam pattern information, and the DRS transmit beam pattern information comprises an indication of whether at least one network node for the one or more cells is or is expected to transmit DRS signals according to a DRS transmit beam pattern.

16. The wireless device of claim 14 wherein the information related to DRS transmission configuration comprises the DRS transmit beam pattern information, and the DRS transmit beam pattern information comprises an indication of a DRS transmit beam pattern that is or is expected to be used for transmission of a DRS resource for at least one of the one or more cells.

17. The wireless device of claim 14 wherein the information related to DRS transmission configuration further comprises information related to physical resources in which a DRS signal is transmitted.

18. The wireless device of claim 14 wherein obtaining the information related to DRS transmission configuration comprises obtaining the information related to DRS transmission configuration from the network node.

19. The wireless device of claim 14 wherein obtaining the information related to DRS transmission configuration comprises obtaining the information related to DRS transmission configuration based on one or more predefined rules.

20. The wireless device of claim 14 wherein obtaining the information related to DRS transmission configuration comprises obtaining the information related to DRS transmission configuration autonomously.

* * * * *